United States Patent
Nimura

(10) Patent No.: US 12,365,342 B2
(45) Date of Patent: Jul. 22, 2025

(54) DRIVE ASSISTANCE DEVICE AND COMPUTER PROGRAM

(71) Applicant: AISIN CORPORATION, Aichi (JP)

(72) Inventor: Mitsuhiro Nimura, Kariya (JP)

(73) Assignee: AISIN CORPORATION, Aichi (JP)

( * ) Notice: Subject to any disclaimer, the term of this patent is extended or adjusted under 35 U.S.C. 154(b) by 220 days.

(21) Appl. No.: 17/919,561

(22) PCT Filed: Jun. 14, 2021

(86) PCT No.: PCT/JP2021/022577
§ 371 (c)(1),
(2) Date: Oct. 18, 2022

(87) PCT Pub. No.: WO2021/256439
PCT Pub. Date: Dec. 23, 2021

(65) Prior Publication Data
US 2023/0150508 A1    May 18, 2023

(30) Foreign Application Priority Data

Jun. 19, 2020  (JP) ................................. 2020-105798

(51) Int. Cl.
*B60W 30/18*    (2012.01)
*B60W 50/00*    (2006.01)

(52) U.S. Cl.
CPC ...... *B60W 30/18163* (2013.01); *B60W 50/00* (2013.01); *B60W 2050/0083* (2013.01); *B60W 2552/53* (2020.02); *B60W 2556/40* (2020.02)

(58) Field of Classification Search
CPC .......... B60W 30/18163; B60W 50/00; B60W 2050/0083; B60W 2552/53;
(Continued)

(56) References Cited

U.S. PATENT DOCUMENTS 6,173,219 B1 *  1/2001  Deker .................. G05D 1/0202
                                                   701/410
9,616,889 B2 *  4/2017  Lee .................... B60W 30/0953
(Continued)

FOREIGN PATENT DOCUMENTS

JP   2020-085749 A    6/2020
WO  2017/159489 A1    9/2017

OTHER PUBLICATIONS

International Search Report of PCT/JP2021/022577 dated Aug. 17, 2021 [PCT/ISA/210].

*Primary Examiner* — Frederick M Brushaber
(74) *Attorney, Agent, or Firm* — Sughrue Mion, PLLC

(57) ABSTRACT

Provided is a drive assistance device preventing an unrecommended lane when a vehicle travels, enabling appropriate provision of driving assistance. Specifically, candidates for a way of moving into a selectable lane when the vehicle moves along a planned travel route are identified and obtained by using map information. Then, for a candidate that involves a lane change among the obtained candidates for a way of moving into a lane, a lane change start location at which a lane change starts and a lane change end location at which the lane change ends are set at a location close to a destination on a priority basis, and manner of moving into a lane for the vehicle that is recommended when the vehicle moves is selected from among the candidates for a way of moving into a lane, taking into account the set lane change start location and lane change end location.

5 Claims, 28 Drawing Sheets

(58) Field of Classification Search
CPC .......... B60W 2556/40; B60W 2556/50; G08G 1/096811; G08G 1/096827; G08G 1/096866; G08G 1/0112; G08G 1/096844; G08G 1/167; G01C 21/3658
See application file for complete search history.

(56) References Cited

U.S. PATENT DOCUMENTS

| | | | |
|---|---|---|---|
| 11,230,291 B2* | 1/2022 | Fukuda | G05D 1/0219 |
| 2014/0278052 A1* | 9/2014 | Slavin | G01C 21/3492 |
| | | | 701/400 |
| 2016/0090087 A1* | 3/2016 | Lee | B60W 30/18163 |
| | | | 701/93 |
| 2018/0186378 A1 | 7/2018 | Zhuang et al. | |
| 2019/0009819 A1 | 1/2019 | Ishioka et al. | |
| 2019/0171206 A1 | 6/2019 | Abrams et al. | |
| 2020/0247413 A1* | 8/2020 | Fukuda | B60W 30/10 |
| 2022/0258763 A1* | 8/2022 | Nimura | G01C 21/3407 |
| 2023/0150508 A1* | 5/2023 | Nimura | G08G 1/096844 |
| | | | 701/41 |
| 2023/0375347 A1* | 11/2023 | Nimura | B60W 40/06 |
| 2024/0067214 A1* | 2/2024 | Nagasaka | G01C 21/3492 |
| 2024/0068820 A1* | 2/2024 | Nimura | G01C 21/20 |
| 2024/0174227 A1* | 5/2024 | Nimura | G08G 1/143 |

* cited by examiner

DRIVE ASSISTANCE DEVICE AND COMPUTER PROGRAM

CROSS REFERENCE TO RELATED APPLICATIONS

This application is a National Stage of International Application No. PCT/JP2021/022577 filed on Jun. 14, 2021, claiming priority based on Japanese Patent Application No. 2020-105798 filed on Jun. 19, 2020.

TECHNICAL FIELD

The present disclosure relates to a drive assistance device and a computer program that provide driving assistance for a vehicle.

BACKGROUND ART

In order to provide appropriate driving assistance when there is a need for a vehicle to make a lane change in the future to move from a lane in which the vehicle currently travels to another lane, it is important to identify in advance optimal timing for the vehicle to make a lane change, i.e., recommended timing for a lane change.

Hence, WO 2017/159489 A proposes a technique in which when an action plan for a vehicle that travels by autonomous driving is created, a route along which the vehicle plans to travel is divided into a plurality of blocks, and furthermore, a target lane is set for each block, and based on the set target lane, events performed by the vehicle, such as a deceleration event, an acceleration event, a lane keeping event, and a lane change event, are combined for the block, which is created as an action plan.

CITATIONS LIST

Patent Literature

Patent Literature 1: WO 2017/159489 A (pp. 10-14 and FIG. 6)

SUMMARY OF THE DISCLOSURE

Technical Problems

Here, in the technique of the above-described Patent Literature 1, a route along which the vehicle plans to travel is divided into a plurality of blocks, and a lane change event is associated with a block. Namely, timing for making a lane change is identified on a block-by-block basis, but on the other hand, specific timing for making a lane change in a block has not been identified beforehand so that a plan has flexibility (see paragraphs 0055 to 0058 and FIG. 6 of Patent Literature 1). In the above-described Patent Literature 1, at a point in time when the vehicle goes into a situation in which a lane change is actually made, i.e., a point in time when the vehicle travels through a block with which a lane change event is associated, surroundings are checked, and then timing for making a lane change is determined.

However, in an action plan having a certain degree of latitude as in the above-described Patent Literature 1 in which timing for making a lane change is identified beforehand only on a block-by-block basis, there has been a possibility that an unrecommended lane change may be made when the vehicle actually travels. For example, for a case in which as shown in FIG. 28, an action plan is created for a planned travel route where a right turn is made at an intersection, it is assumed that an action plan is created in which a lane change from a left lane to a middle lane is made in a block A which is the second closest block to the intersection, and a lane change from the middle lane to a right lane is made in a block B closest to the intersection. In that case, if a vehicle traveling through the block A does not make a lane change until reaching just before a boundary of the block A due to the presence of another vehicle, etc., then when the block B has a short section, a lane change in the block A and a lane change in the block B are continuously made, or a lane change in the block B is made near the intersection. As a result, there is a possibility that appropriate driving assistance may not be able to be provided.

The aspects of the present disclosure were made to solve the above-described conventional problem, and provide a drive assistance device and a computer program in which candidates for a way of moving into a lane that can be selected by a vehicle are identified and obtained using a lane network, and for each candidate, a lane change start location at which a lane change starts and a lane change end location at which the lane change ends are set in advance at a location close to a destination on a priority basis, and in that state, a recommended way of moving into a lane is selected from among the candidates for a way of moving into a lane, and thus, an unrecommended lane change is prevented from being made when the vehicle travels, enabling appropriate provision of driving assistance.

Solutions to Problems

To provide the above-described drive assistance device and computer program, a drive assistance device according to the present disclosure includes: planned travel route obtaining means for obtaining a planned travel route along which a vehicle travels; lane network obtaining means for obtaining a lane network for the planned travel route, based on map information including lane configurations, the lane network being a network representing movement into a lane that can be selected by a vehicle; candidate obtaining means for identifying and obtaining, using the lane network, candidates for a way of moving into a lane that can be selected when a vehicle moves along the planned travel route; lane change location setting means for setting, for the candidate for a way of moving into a lane that involves a lane change among the candidates for a way of moving into a lane obtained by the candidate obtaining means, a lane change start location at which a lane change starts and a lane change end location at which a lane change ends, at a location close to a destination on a priority basis; recommended way-of-moving selecting means for selecting a way of moving into a lane for a vehicle that is recommended when a vehicle moves, from among the candidates for a way of moving into a lane, taking into account the lane change start location and the lane change end location set by the lane change location setting means; and driving assistance means for providing driving assistance for a vehicle to move in accordance with a way of moving into a lane selected by the recommended way-of-moving selecting means.

In addition, a computer program according to the present disclosure is a program that generates assistance information used for driving assistance provided to a vehicle. Specifically, the computer program is a computer program for causing a computer to function as: planned travel route obtaining means for obtaining a planned travel route along which a vehicle travels; lane network obtaining means for obtaining a lane network for the planned travel route, based on map information including lane configurations, the lane network being a network representing movement into a lane that can be selected by a vehicle; candidate obtaining means for identifying and obtaining, using the lane network, candidates for a way of moving into a lane that can be selected when a vehicle moves along the planned travel route; lane change location setting means for setting, for the candidate for a way of moving into a lane that involves a lane change among the candidates for a way of moving into a lane obtained by the candidate obtaining means, a lane change start location at which a lane change starts and a lane change end location at which a lane change ends, at a location close to a destination on a priority basis; recommended way-of-moving selecting means for selecting a way of moving into a lane for a vehicle that is recommended when a vehicle moves, from among the candidates for a way of moving into a lane, taking into account the lane change start location and the lane change end location set by the lane change location setting means; and driving assistance means for providing driving assistance for a vehicle to move in accordance with a way of moving into a lane selected by the recommended way-of-moving selecting means.

Advantageous Effects of Various Aspects of the Disclosure

According to the drive assistance device and computer program according to the present disclosure that have the above-described configurations, candidates for a way of moving into a lane that can be selected by a vehicle are identified and obtained using a lane network, and for each candidate, a lane change start location at which a lane change starts and a lane change end location at which the lane change ends are set in advance at a location close to a destination on a priority basis, and in that state, a recommended way of moving into a lane is selected from among the candidates for a way of moving into a lane, and thus, it becomes possible to appropriately select a way of moving into a lane that makes a recommended lane change. As a result, an unrecommended lane change is prevented from being made when the vehicle travels, enabling appropriate provision of driving assistance.

DESCRIPTION OF EMBODIMENTS

Figure 1:
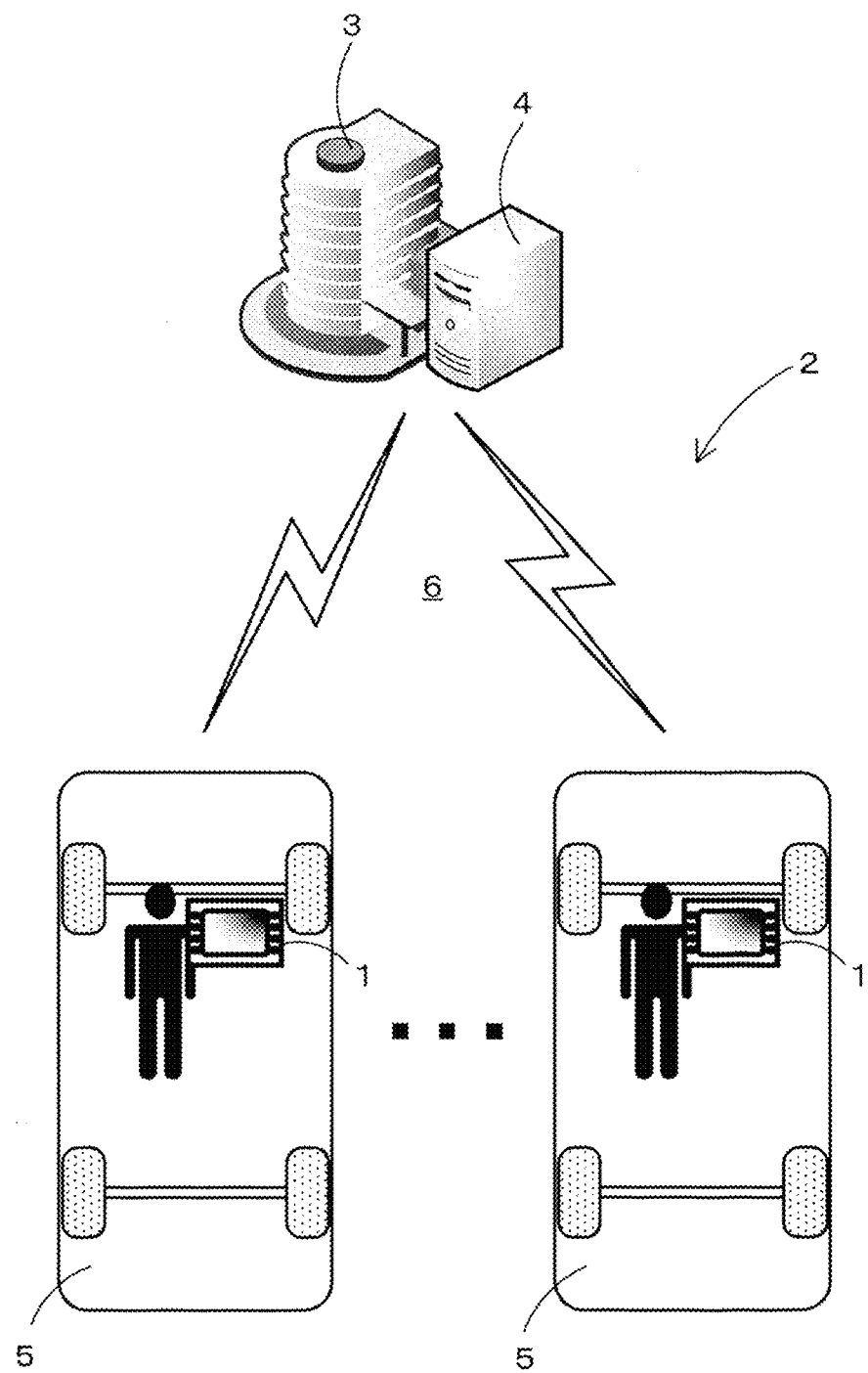
FIG. 1 is a schematic configuration diagram showing a drive assistance system according to the present embodiment.
Figure 2:
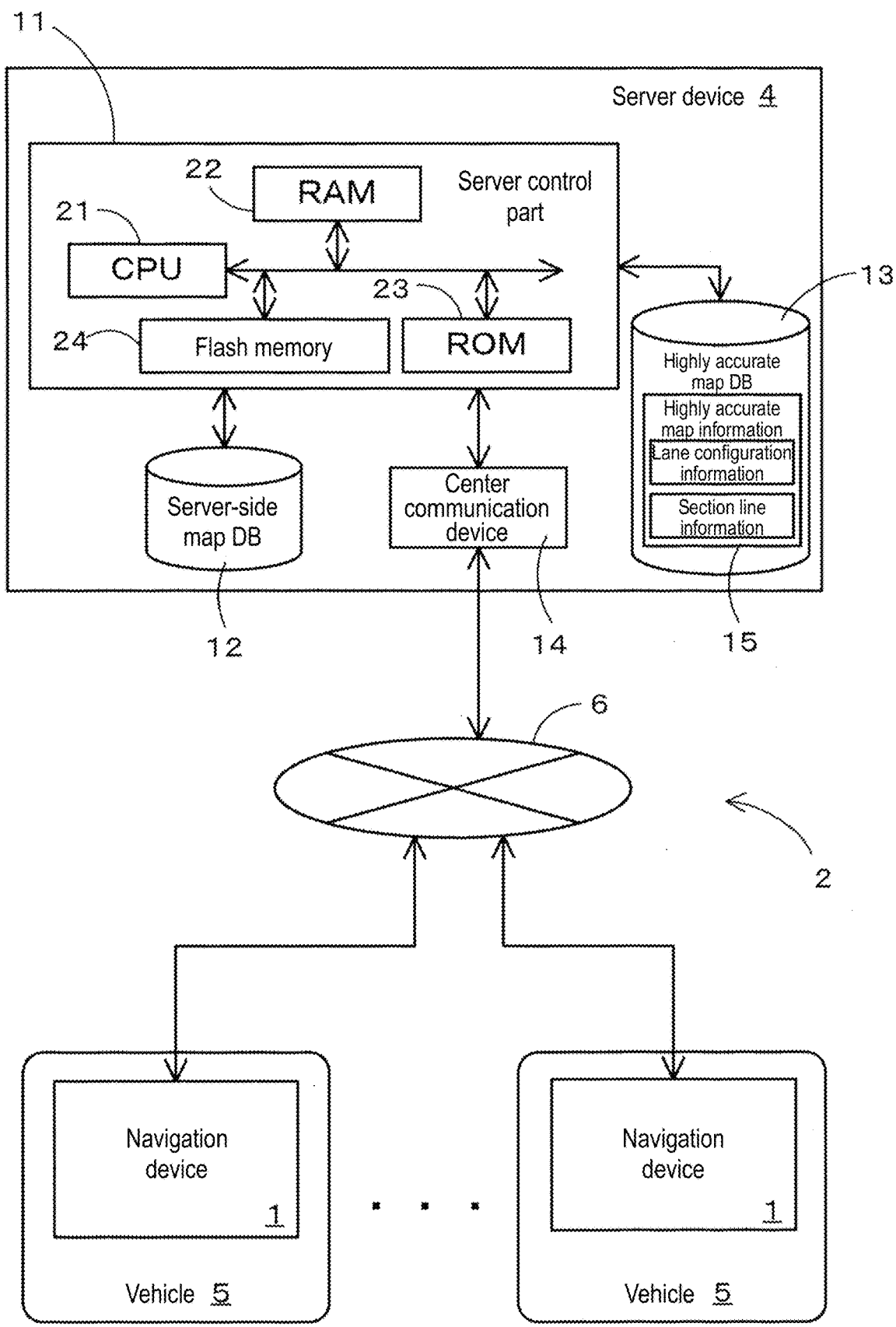
FIG. 2 is a block diagram showing a configuration of the drive assistance system according to the present embodiment.

One embodiment in which a drive assistance device embodies a navigation device 1 will be described in detail below with reference to the drawings. First, a schematic configuration of a drive assistance system 2 including navigation devices 1 according to the present embodiment will be described using FIGS. 1 and 2. FIG. 1 is a schematic configuration diagram showing the drive assistance system 2 according to the present embodiment. FIG. 2 is a block diagram showing a configuration of the drive assistance system 2 according to the present embodiment.

As shown in FIG. 1, the drive assistance system 2 according to the present embodiment basically includes a server device 4 provided in an information delivery center 3; and navigation devices 1 mounted on vehicles 5 to provide various types of assistance related to autonomous driving of the vehicles 5. In addition, the server device 4 and the navigation devices 1 are configured to be able to perform transmission and reception of electronic data with each other through a communication network 6. Note that instead of the navigation devices 1, other in-vehicle devices mounted on the vehicles 5 or vehicle control devices that perform control for the vehicles 5 may be used.

Here, the vehicles 5 each are a vehicle that can perform assistance travel by autonomous driving assistance that allows the vehicle to autonomously travel along a preset route or road independently of user's driving operations, in addition to manual driving travel that allows the vehicle 5 to travel based on user's driving operations.

In addition, a configuration may be adopted in which autonomous driving assistance is provided for all road sections or provided only while the vehicle travels on a specific road section (e.g., an expressway having a gate (it does not matter whether or not there is a person or whether or not a toll is collected) at a boundary). The following description is made assuming that autonomous driving sections in which autonomous driving assistance for the vehicle is provided include parking lots in addition to all road sections including general roads and expressways, and that autonomous driving assistance is basically provided during a period from when the vehicle starts to travel until the vehicle ends the travel. Note, however, that it is desirable that when the vehicle travels on the autonomous driving sections, autonomous driving assistance not always be provided, but be provided only in a situation in which provision of autonomous driving assistance is selected by the user (e.g., an autonomous driving start button is turned on) and it is determined that travel by autonomous driving assistance can be performed. On the other hand, the vehicles 5 may be vehicles that can only perform assistance travel by autonomous driving assistance.

In vehicle control performed during autonomous driving assistance, for example, a current location of the vehicle, a lane in which the vehicle travels, and the location of an obstacle around the vehicle are detected whenever necessary, and vehicle control of steering, a drive source, a brake, etc., is autonomously performed so that the vehicle travels along a travel path generated by the navigation device 1 and at a speed in accordance with a speed plan created likewise, as will be described later. Note that in assistance travel by autonomous driving assistance of the present embodiment, for a lane change and a left or right turn, too, the vehicle travels by performing the above-described vehicle control by autonomous driving assistance, but a configuration may be adopted in which special travel such as a lane change and a left or right turn is performed by manual driving instead of performing travel by autonomous driving assistance.

Meanwhile, the navigation devices 1 each are an in-vehicle device mounted on a vehicle 5, and displays a map of an area around the location of the vehicle 5 based on map data included in the navigation device 1 or map data obtained from an external source, displays a current location of the vehicle on a map image, or provides movement guidance along a set guidance route. In the present embodiment, particularly, when the vehicle performs assistance travel by autonomous driving assistance, various types of assistance information about the autonomous driving assistance are generated. The assistance information includes, for example, a travel path recommended for the vehicle to travel along (including a recommended way of moving into a lane) and a speed plan indicating vehicle speed used upon traveling. Note that details of the navigation device 1 will be described later.

In addition, the server device 4 performs a route search in response to a request from a navigation device 1. Specifically, when a destination is set on the navigation device 1 or when re-searching of a route (rerouting) is performed, information required for a route search such as a point of departure and a destination is transmitted with a route search request from the navigation device 1 to the server device 4 (note, however, that in a case of re-searching, information about a destination does not necessarily need to be transmitted). Then, the server device 4 having received the route search request performs a route search using map information included in the server device 4, to identify a recommended route from the point of departure to the destination. Thereafter, the identified recommended route is transmitted to the navigation device 1 which is a source of the request. Then, the navigation device 1 provides a user with information about the received recommended route, or sets the recommended route as a guidance route and generates various types of assistance information about autonomous driving assistance, in accordance with the guidance route. Therefore, even when map information included in the navigation device 1 at the time of the route search is an old version of map information, or the navigation device 1 does not have map information itself, an appropriate recommended route to the destination can be provided based on the latest version of map information included in the server device 4.

Furthermore, the server device 4 has highly accurate map information which is map information with a higher degree of accuracy, separately from normal map information used for the above-described route search. The highly accurate map information includes, for example, information about the lane configurations of roads (lane-by-lane road configurations, curvatures, lane widths, etc.) and section lines painted on roads (roadway centerlines, lane boundary lines, roadway outer lines, guidelines, etc.). In addition to the information, the highly accurate map information also includes information about intersections, information about parking lots, etc. The server device 4 delivers highly accurate map information in response to a request from a navigation device 1, and the navigation device 1 generates various types of assistance information about autonomous driving assistance as will be described later, using the highly accurate map information delivered from the server device 4. Note that the highly accurate map information is basically map information targeting only roads (links) and areas around the roads, but may be map information also including areas other than the areas around the roads.

Note, however, that the above-described route search process does not necessarily need to be performed by the server device 4, and if a navigation device 1 has map information, then the navigation device 1 may perform the route search process. Note also that highly accurate map information may be included in advance in the navigation device 1, instead of the server device 4 delivering the highly accurate map information.

In addition, the communication network 6 includes multiple base stations disposed all over the country and telecommunications companies that manage and control their base stations, and is formed by connecting the base stations to the telecommunications companies by wire (optical fiber, ISDN, etc.) or wirelessly. Here, the base stations each include a transceiver and an antenna that perform communication with navigation devices 1. The base station performs radio communication with a telecommunications company, whereas the base station serves as an end of the communication network 6 and plays a role in relaying communication of navigation devices 1 present in an area (cell) in which radio waves from the base station reach, to the server device 4.

Next, a configuration of the server device 4 in the drive assistance system 2 will be described in more detail using FIG. 2. The server device 4 includes, as shown in FIG. 2, a server control part 11, a server-side map DB 12 serving as information recording means and connected to the server control part 11, a highly accurate map DB 13, and a server-side communication device 14.

The server control part 11 is a control unit (an MCU, an MPU, etc.) that performs overall control of the server device 4, and includes a CPU 21 serving as a computing device and a control device; and internal storage devices such as a RAM 22 used as a working memory when the CPU 21 performs various types of arithmetic processing, a ROM 23 having recorded therein a program for control, etc., and a flash memory 24 that stores a program read from the ROM 23. Note that the server control part 11 includes various types of means serving as processing algorithms with an ECU of a navigation device 1 which will be described later.

Meanwhile, the server-side map DB 12 is storage means for storing server-side map information which is the latest version of map information registered based on input data from an external source and input operations. Here, the server-side map information includes a road network and various types of information required for a route search, route guidance, and map display. The server-side map information includes, for example, network data including nodes and links that indicate a road network, link data about roads (links), node data about node points, intersection data about each intersection, point data about points such as facilities, map display data for displaying a map, search data for searching for a route, and retrieval data for retrieving a point.

In addition, the highly accurate map DB 13 is storage means for storing highly accurate map information 15 which is map information with a higher degree of accuracy than the above-described server-side map information. The highly accurate map information 15 is particularly map information that stores more detailed information about roads, parking lots, etc., where the vehicles are to travel, and in the present embodiment, the highly accurate map information 15 includes, for example, information about the lane configurations of roads (lane-by-lane road configurations, curvatures, lane widths, etc.) and section lines (roadway centerlines, lane boundary lines, roadway outer lines, guidelines, etc.) painted on roads. In addition, the highly accurate map DB 13 further records the following data: for each link that forms a road, there are recorded shape complement point data for identifying width, gradient, a cant, a bank, a road surface state, and the shape of a link between nodes (e.g., in a case of a curved road, the shape of a curve) of the road to which the link belongs, and data representing a merge section, a road structure, the number of lanes on the road, a location where the number of lanes decreases, a location where the width becomes narrower, a railroad crossing, etc.; for a corner, there is recorded data representing the radius of curvature, an intersection, a T-junction, the entry and exit of the corner, etc.; for road attributes, there is recorded data representing downhill slopes, uphill slopes, etc.; and for road types, there is recorded data representing general roads such as national highways, prefectural highways, and narrow streets, and toll roads such as national expressways, urban expressways, automobile roads, general toll roads, and toll bridges. Particularly, in the present embodiment, in addition to the number of lanes on roads, there is also stored information that identifies a passage segment in a traveling direction for each lane and a connection between roads for each lane (specifically, a correspondence between a lane included in a road taken before passing through an intersection and a lane included in a road taken after passing through the intersection). Furthermore, there are also stored speed limits set for roads. In addition, the highly accurate map information is basically map information targeting only roads (links) and areas around the roads, but may be map information also including areas other than the areas around the roads. In addition, although in the example shown in FIG. 2, the server-side map information stored in the server-side map DB 12 and the highly accurate map information 15 are different pieces of map information, the highly accurate map information 15 may be a part of the server-side map information.

Meanwhile, the server-side communication device 14 is a communication device for performing communication with the navigation device 1 of each vehicle 5 through the communication network 6. In addition, the server-side communication device 14 can also receive traffic information including pieces of information such as congestion information, regulation information, and traffic accident information which are transmitted from an Internet network, traffic information centers, e.g., a VICS (registered trademark: Vehicle Information and Communication System) center, etc., in addition to the navigation devices 1.

Figure 3:
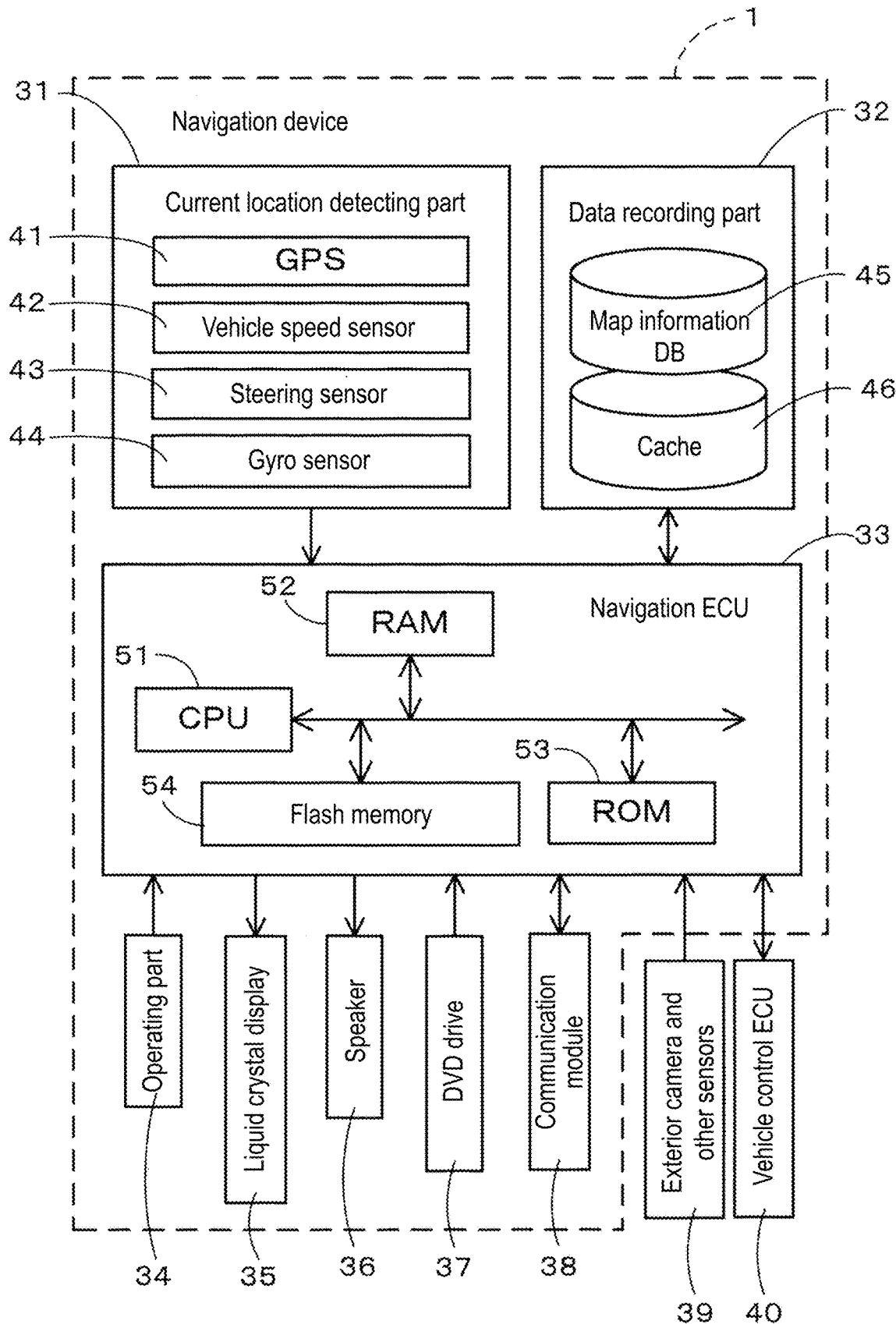
FIG. 3 is a block diagram showing a navigation device according to the present embodiment.

Next, a schematic configuration of the navigation device 1 mounted on the vehicle 5 will be described using FIG. 3. FIG. 3 is a block diagram showing the navigation device 1 according to the present embodiment.

As shown in FIG. 3, the navigation device 1 according to the present embodiment includes a current location detecting part 31 that detects a current location of the vehicle having the navigation device 1 mounted thereon; a data recording part 32 having various types of data recorded therein; a navigation ECU 33 that performs various types of arithmetic processing based on inputted information; an operating part 34 that accepts operations from a user; a liquid crystal display 35 that displays to the user, for example, a map of an area around the vehicle and information about a guidance route (a planned travel route of the vehicle) set on the navigation device 1; a speaker 36 that outputs voice guidance about route guidance; a DVD drive 37 that reads a DVD which is a storage medium; and a communication module 38 that performs communication with information centers such as a probe center and a VICS center. In addition, an exterior camera 39 and various sensors which are installed on the vehicle having the navigation device 1 mounted thereon are connected to the navigation device 1 through an in-vehicle network such as a CAN. Furthermore, the navigation device 1 is also connected to a vehicle control ECU 40 in a two-way communicable manner that performs various types of control on the vehicle having the navigation device 1 mounted thereon.

The components included in the navigation device 1 will be described in turn below.

The current location detecting part 31 includes a GPS 41, a vehicle speed sensor 42, a steering sensor 43, a gyro sensor 44, etc., and can detect the current location and orientation of the vehicle, a travel speed of the vehicle, a current time, etc. Here, particularly, the vehicle speed sensor 42 is a sensor for detecting the moving distance and vehicle speed of the vehicle, and generates pulses according to the rotation of drive wheels of the vehicle and outputs a pulse signal to the navigation ECU 33. Then, the navigation ECU 33 counts the generated pulses, thereby calculating the rotational speed and moving distance of the drive wheels. Note that the navigation device 1 does not need to include all of the above-described four types of sensors, and the navigation device 1 may be configured to include only one or a plurality of types of sensors among those sensors.

In addition, the data recording part 32 includes a hard disk (not shown) serving as an external storage device and a recording medium; and a recording head (not shown) which is a driver for reading a map information DB 45 recorded on the hard disk, a cache 46, a predetermined program, etc., and for writing predetermined data to the hard disk. Note that the data recording part 32 may include a flash memory, a memory card, or an optical disc such as a CD or a DVD, instead of a hard disk. In addition, in the present embodiment, as described above, the server device 4 searches for a route to a destination, and thus, the map information DB 45 may be omitted. Even when the map information DB 45 is omitted, it is also possible to obtain map information from the server device 4 as necessary.

Here, the map information DB 45 is storage means having stored therein, for example, link data about roads (links), node data about node points, search data used in processes related to a route search or change, facility data about facilities, map display data for displaying a map, intersection data about each intersection, and retrieval data for retrieving a point.

On the other hand, the cache 46 is storage means for saving highly accurate map information 15 having been delivered from the server device 4 in the past. A saving period can be set as appropriate, and may be, for example, a predetermined period (e.g., one month) after storage or may be until an ACC power supply (accessory power supply) of the vehicle is turned off. In addition, after the amount of data stored in the cache 46 reaches an upper limit, the data may be sequentially deleted in order from oldest to newest. Then, the navigation ECU 33 generates various types of assistance information about autonomous driving assistance, using the highly accurate map information 15 stored in the cache 46. Details will be described later.

Meanwhile, the navigation ECU (electronic control unit) 33 is an electronic control unit that performs overall control of the navigation device 1, and includes a CPU 51 serving as a computing device and a control device; and internal storage devices such as a RAM 52 that is used as a working memory when the CPU 51 performs various types of arithmetic processing and that stores route data obtained when a route is searched, etc., a ROM 53 having recorded therein a program for control and an autonomous driving assistance program (see FIG. 4) which will be described later, etc., and a flash memory 54 that stores a program read from the ROM 53. Note that the navigation ECU 33 includes various types of means serving as processing algorithms. For example, planned travel route obtaining means obtains a planned travel route along which the vehicle travels. Lane network obtaining means obtains a lane network for the planned travel route, based on map information including lane configurations, the lane network being a network representing movement into a lane that can be selected by the vehicle. Candidate obtaining means identifies and obtains, using the lane network, candidates for a way of moving into a lane that can be selected when the vehicle moves along the planned travel route. Lane change location setting means sets, for a candidate for a way of moving into a lane that involves a lane change among the candidates for a way of moving into a lane obtained by the candidate obtaining means, a lane change start location at which a lane change starts and a lane change end location at which the lane change ends, at a location close to a destination on a priority basis. Recommended way-of-moving selecting means selects a way of moving into a lane for the vehicle that is recommended when the vehicle moves, from among the candidates for a way of moving into a lane, taking into account the lane change start location and lane change end location set by the lane change location setting means. Driving assistance means provides driving assistance for the vehicle to move in accordance with the way of moving into a lane selected by the recommended way-of-moving selecting means.

The operating part 34 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 33 performs control to perform a corresponding one of various types of operation. Note that the operating part 34 may include a touch panel provided on the front of the liquid crystal display 35. Note also that the operating part 34 may include a microphone and a voice recognition device.

In addition, on the liquid crystal display 35 there are displayed a map image including roads, traffic information, operation guidance, an operation menu, guidance on keys, guidance information in accordance with a guidance route (planned travel route), news, weather forecasts, time, e-mails, TV programs, etc. Note that instead of the liquid crystal display 35, a HUD or an HMD may be used.

In addition, the speaker 36 outputs voice guidance that provides guidance on travel along a guidance route (planned travel route) or guidance on traffic information, based on an instruction from the navigation ECU 33.

In addition, the DVD drive 37 is a drive that can read data recorded on a recording medium such as a DVD or a CD. Based on the read data, for example, music or video is played back or the map information DB 45 is updated. Note that instead of the DVD drive 37, a card slot for performing reading and writing on a memory card may be provided.

In addition, the communication module 38 is a communication device for receiving traffic information, probe information, weather information, etc., which are transmitted from traffic information centers, e.g., a VICS center, a probe center, etc., and corresponds, for example, to a mobile phone or a DCM. In addition, the communication module 38 also includes a vehicle-to-vehicle communication device that performs communication between vehicles and a road-side-device-to-vehicle communication device that performs communication with a road-side device. In addition, the communication module 38 is also used to transmit and receive route information searched by the server device 4 and the highly accurate map information 15 to/from the server device 4.

In addition, the exterior camera 39 is composed of, for example, a camera using a solid-state imaging device such as a CCD, and is attached to the upper side of a front bumper of the vehicle and is placed such that an optical-axis direction is downward at a predetermined angle relative to the horizontal. When the vehicle travels on an autonomous driving section, the exterior camera 39 captures an image of an area ahead of the vehicle in a traveling direction. In addition, the navigation ECU 33 performs image processing on the captured image having been captured, thereby detecting section lines painted on a road on which the vehicle travels, and obstacles such as another vehicle around the vehicle, and generating various types of assistance information about autonomous driving assistance, based on results of the detection. For example, when an obstacle is detected, a new travel path for the vehicle to travel avoiding or following the obstacle is generated. Note that the exterior camera 39 may be configured to be disposed on the rear or side of the vehicle other than the front. Note also that for means for detecting obstacles, a sensor such as millimeter-wave radar or a laser sensor, vehicle-to-vehicle communication, or road-side-device-to-vehicle communication may be used instead of a camera.

In addition, the vehicle control ECU 40 is an electronic control unit that controls the vehicle having the navigation device 1 mounted thereon. In addition, driving parts of the vehicle such as steering, a brake, and an accelerator are connected to the vehicle control ECU 40, and in the present embodiment, particularly, after the vehicle starts autonomous driving assistance, each of the driving parts is controlled, by which autonomous driving assistance for the vehicle is provided. In addition, when an override is performed by the user during autonomous driving assistance, the fact that the override is performed is detected.

Here, after starting traveling, the navigation ECU 33 transmits various types of assistance information about autonomous driving assistance which is generated by the navigation device 1 to the vehicle control ECU 40 through the CAN. Then, the vehicle control ECU 40 provides autonomous driving assistance after starting traveling, using the received various types of assistance information. The assistance information includes, for example, a travel path along which the vehicle is recommended to travel and a speed plan indicating vehicle speed used upon traveling.

Figure 4:
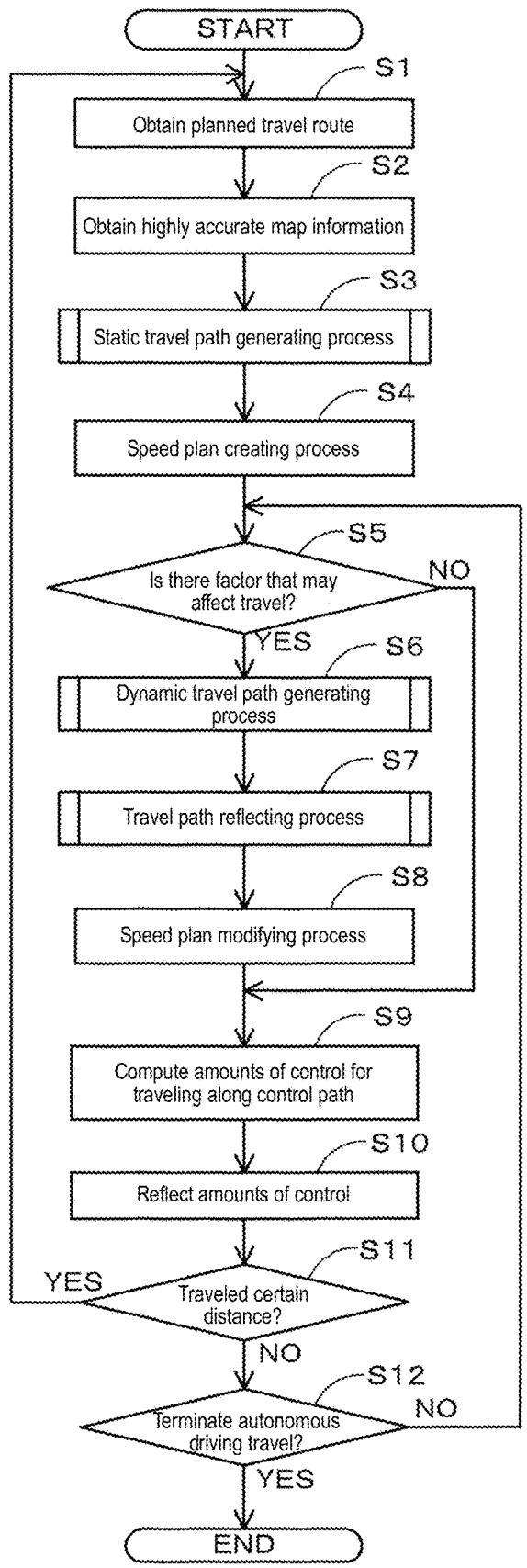
FIG. 4 is a flowchart of an autonomous driving assistance program according to the present embodiment.

Next, an autonomous driving assistance program executed by the CPU 51 of the navigation device 1 according to the present embodiment that has the above-described configuration will be described based on FIG. 4. FIG. 4 is a flowchart of an autonomous driving assistance program according to the present embodiment. Here, the autonomous driving assistance program is a program that is executed after the ACC power supply (accessory power supply) of the vehicle is turned on and when travel of the vehicle by autonomous driving assistance has started, and that performs assistance travel by autonomous driving assistance in accordance with assistance information generated by the navigation device 1. In addition, the program shown in flowcharts of the following FIGS. 4, 6, 16, 22, and 27 is stored in the RAM 52 or the ROM 53 included in the navigation device 1, and is executed by the CPU 51.

First, in the autonomous driving assistance program, at step (hereinafter, abbreviated as S) 1, the CPU 51 obtains a route along which the vehicle plans to travel in the future (hereinafter, referred to as planned travel route). Note that for the planned travel route of the vehicle, when a guidance route is set on the navigation device 1, a route from a current location of the vehicle to a destination in the guidance route currently set on the navigation device 1 is a planned travel route. On the other hand, when a guidance route is not set on the navigation device 1, a route where the vehicle travels along a road from a current location of the vehicle may be a planned travel route.

In addition, the guidance route is a recommended route from a point of departure to a destination that is set by the navigation device 1, and in the present embodiment, particularly, the recommended route is searched by the server device 4. When a recommended route is searched, first, the CPU 51 transmits a route search request to the server device 4. Note that the route search request includes a terminal ID that identifies the navigation device 1 which is a sender of the route search request; and information that identifies a point of departure (e.g., a current location of the vehicle) and a destination. Note that upon re-searching, information that identifies a destination is not necessarily needed. Thereafter, the CPU 51 receives searched-route information transmitted from the server device 4 in response to the route search request. The searched-route information is information that identifies a recommended route (center route) from the point of departure to the destination (e.g., a series of links included in the recommended route) which is searched by the server device 4 based on the transmitted route search request and using the latest version of map information. The search is performed using, for example, the publicly known Dijkstra's algorithm. Then, the CPU 51 sets the received recommended route as a guidance route of the navigation device 1.

Then, at S2, the CPU 51 obtains highly accurate map information 15, targeting a section within a predetermined distance from the current location of the vehicle along the planned travel route which is obtained at the above-described S1. For example, highly accurate map information 15 is obtained targeting a portion of the planned travel route included in a secondary mesh in which the vehicle is currently located. Note, however, that a target area for which highly accurate map information 15 is obtained can be changed as appropriate, and for example, highly accurate map information 15 for an area within 3 km from the current location of the vehicle along the planned travel route may be obtained. In addition to such information, highly accurate map information 15 may be obtained targeting the entire planned travel route.

Figure 5:
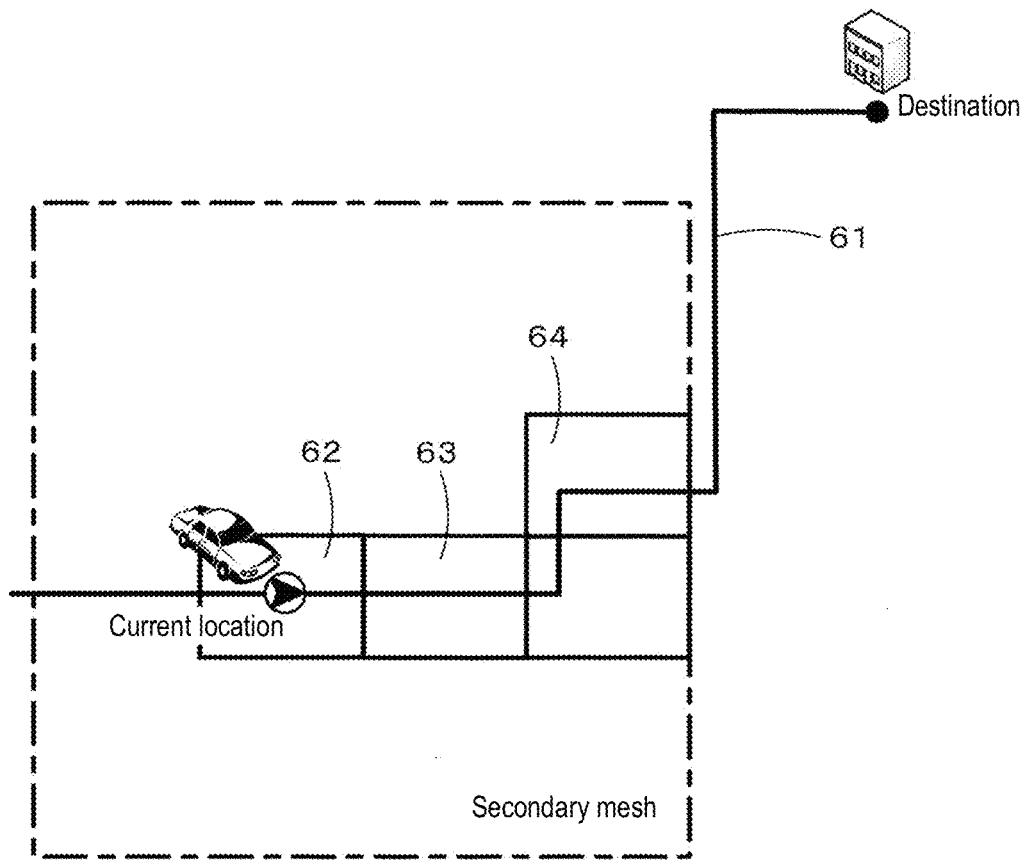
FIG. 5 is a diagram showing an area for which highly accurate map information is obtained.

Here, the highly accurate map information 15 is stored in the highly accurate map DB 13 of the server device 4 so as to be sectioned in rectangular shape (e.g., 500 m×1 km) as shown in FIG. 5. Thus, for example, when a planned travel route 61 is obtained as shown in FIG. 5, highly accurate map information 15 is obtained targeting areas 62 to 64 that include a portion of the planned travel route 61 present in a secondary mesh that includes a current location of the vehicle. The highly accurate map information 15 includes, for example, information about the lane configurations of roads, lane widths, and section lines (roadway centerlines, lane boundary lines, roadway outer lines, guidelines, etc.) painted on the roads. In addition, there are also included, for example, information about intersections and information about parking lots.

In addition, although the highly accurate map information 15 is basically obtained from the server device 4, when there is highly accurate map information 15 for areas that is already stored in the cache 46, the highly accurate map information 15 is obtained from the cache 46. In addition, the highly accurate map information 15 obtained from the server device 4 is temporarily stored in the cache 46.

Figure 6:
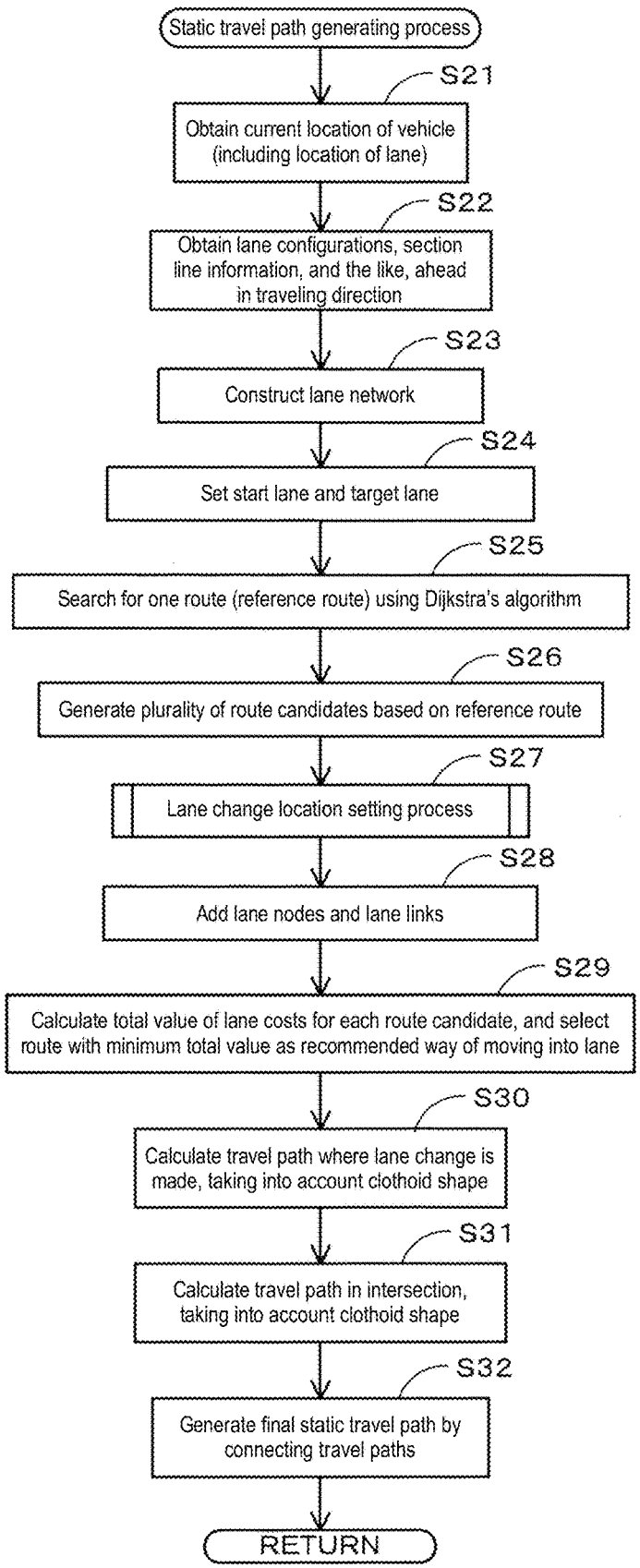
FIG. 6 is a flowchart of a subprocess program of a static travel path generating process.

Thereafter, at S3, the CPU 51 performs a static travel path generating process which will be described later (FIG. 6). Here, the static travel path generating process is a process of generating, for roads included in the planned travel route, a static travel path which is a travel path along which the vehicle is recommended to travel, based on the planned travel route of the vehicle and the highly accurate map information 15 obtained at the above-described S2. Particularly, the CPU 51 identifies, on a lane-by-lane basis, a travel path along which the vehicle is recommended to travel, as a static travel path, the lanes being included in the planned travel route. Note that as will be described later, a static travel path is generated targeting a section from a current location of the vehicle to a location a predetermined distance ahead of the vehicle in a traveling direction (e.g., inside a secondary mesh in which the vehicle is currently located, or all sections to the destination). Note that the predetermined distance can be changed as appropriate, but a static travel path is generated targeting a region including at least outside an area (detection area) for which road conditions around the vehicle can be detected by the exterior camera 39 and other sensors.

Then, at S4, the CPU 51 creates a speed plan for the vehicle which is used upon traveling along the static travel path generated at the above-described S3, based on the highly accurate map information 15 obtained at the above-described S2. For example, a travel speed of the vehicle that is recommended upon traveling along the static travel path is calculated taking into account speed limit information and speed change points (e.g., intersections, curves, railroad crossings, or crosswalks) present on the planned travel route.

Then, the speed plan created at the above-described S4 is stored in the flash memory 54, etc., as assistance information used for autonomous driving assistance. In addition, an acceleration plan indicating acceleration of the vehicle that is required to implement the speed plan created at the above-described S4 may also be created as assistance information used for autonomous driving assistance.

Subsequently, at S5, the CPU 51 determines, as surrounding road conditions, whether there is a factor that affects travel of the vehicle, particularly around the vehicle, by performing image processing on a captured image having been captured with the exterior camera 39. Here, the "factor that affects travel of the vehicle" to be determined at the above-described S5 is a dynamic factor that changes in real time, and static factors resulting from road structures are excluded. For example, the factor that affects travel of the vehicle corresponds to another vehicle that travels or is parked ahead of the vehicle in a traveling direction, a pedestrian located ahead of the vehicle in the traveling direction, a construction section present ahead of the vehicle in the traveling direction, etc. On the other hand, intersections, curves, railroad crossings, merge sections, lane reduction sections, etc., are excluded. In addition, even when there is another vehicle, a pedestrian, or a construction section, if there is no possibility of them overlapping a future travel path of the vehicle (e.g., if they are located away from the future travel path of the vehicle), then they are excluded from the "factor that affects travel of the vehicle". In addition, for means for detecting a factor that may affect travel of the vehicle, a sensor such as millimeter-wave radar or a laser sensor, vehicle-to-vehicle communication, or road-side-device-to-vehicle communication may be used instead of a camera.

Then, if it is determined that there is a factor that affects travel of the vehicle around the vehicle (S5: YES), then processing transitions to S6. On the other hand, if it is determined that there is no factor that affects travel of the vehicle around the vehicle (S5: NO), then processing transitions to S9.

Figure 22:
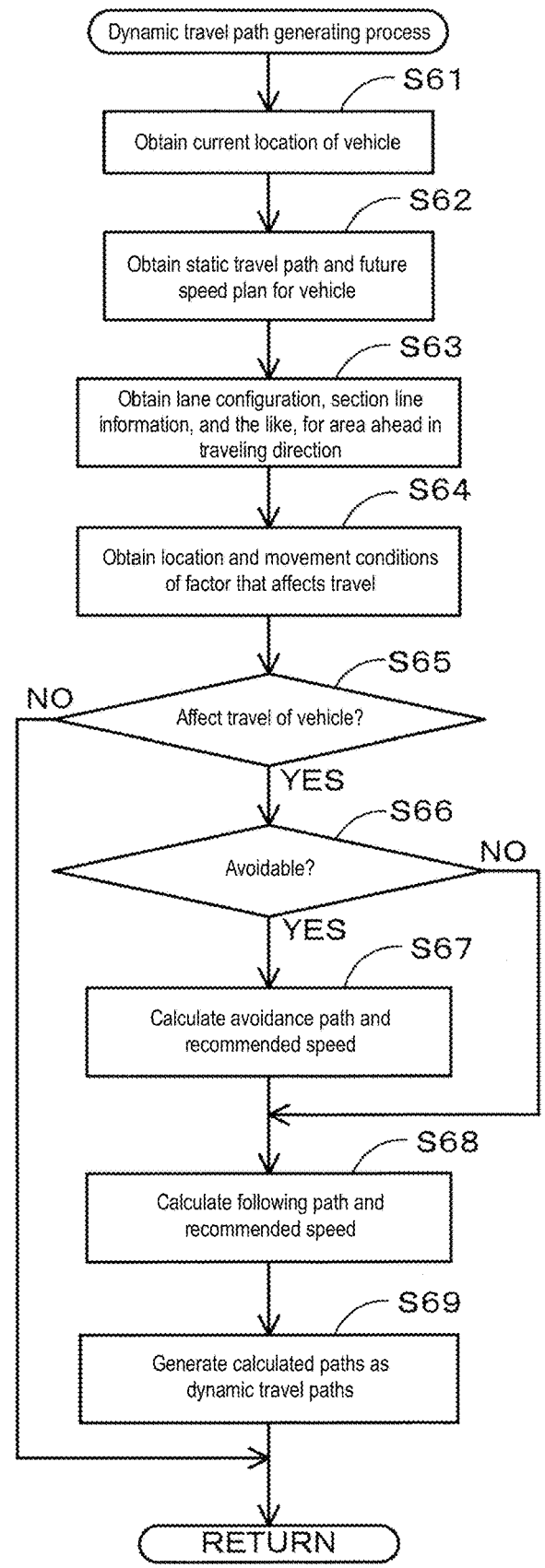
FIG. 22 is a flowchart of a subprocess program of a dynamic travel path generating process.

At S6, the CPU 51 performs a dynamic travel path generating process which will be described later (FIG. 22). Here, in the dynamic travel path generating process, a new path for avoiding or following the "factor that affects travel of the vehicle" detected at the above-described S5 from a current location of the vehicle, and returning to the static travel path is generated as a dynamic travel path. Note that the dynamic travel path is, as will be described later, generated targeting a section including the "factor that affects travel of the vehicle". Note also that the length of the section varies depending on what the factor is. For example, when the "factor that affects travel of the vehicle" is another vehicle traveling ahead of the vehicle (vehicle ahead), as an example, a path where the vehicle makes a lane change to the right to pass the vehicle ahead and then makes a lane change to the left to return to an original lane is generated as a dynamic travel path. Note that since a dynamic travel path is generated based on road conditions around the vehicle which are obtained by the exterior camera 39 and other sensors, a target region for which a dynamic travel path is generated is at least within an area (detection area) for which road conditions around the vehicle can be detected by the exterior camera 39 and other sensors.

Figure 27:
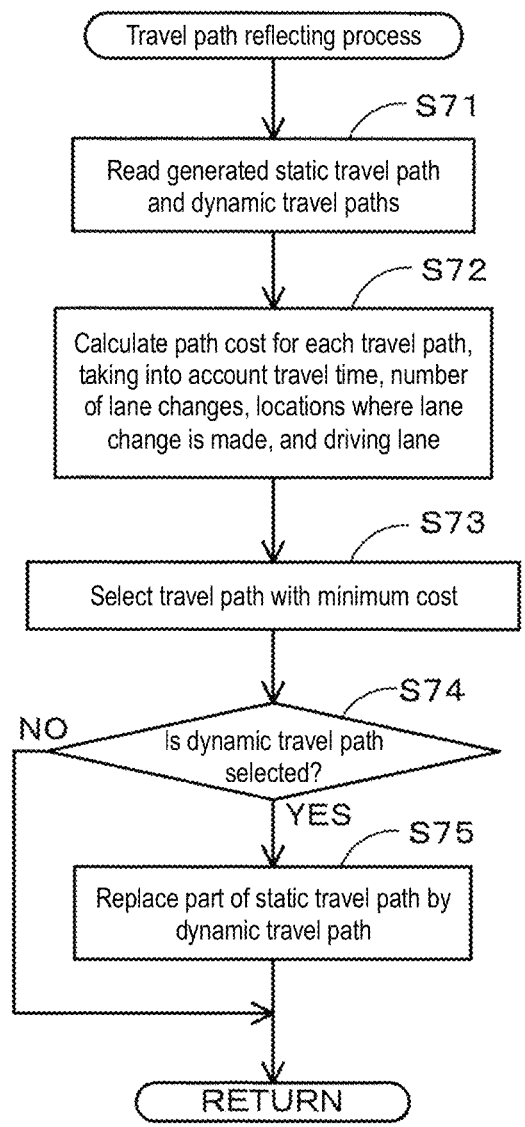
FIG. 27 is a flowchart of a subprocess program of a travel path reflecting process.
Figure 28:
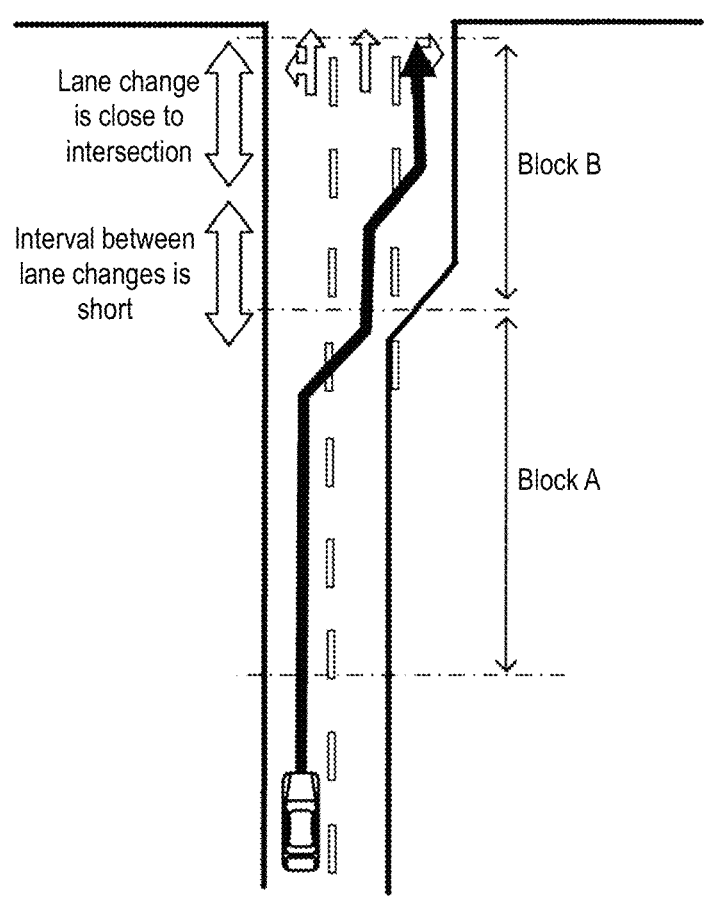
FIG. 28 is a diagram that describes a problem of conventional art.

Subsequently, at S7, the CPU 51 performs a travel path reflecting process which will be described later (FIG. 27). Here, the travel path reflecting process is a process of reflecting the dynamic travel path which is newly generated at the above-described S6 in the static travel path generated at the above-described S3. Specifically, a cost for each of the static travel path and at least one dynamic travel path is calculated for an area from the current location of the vehicle to the end of a section including the "factor that affects travel of the vehicle", and a travel path with a minimum cost is selected. Consequently, a part of the static travel path is replaced by a dynamic travel path as necessary. Note that depending on the situation, the dynamic travel path may not be replaced, i.e., even when the dynamic travel path is reflected, there may be no change in the static travel path generated at the above-described S3. Furthermore, when the dynamic travel path and the static travel path are identical paths, even when replacement is performed, there may be no change in the static travel path generated at the above-described S3.

Then, at S8, the CPU 51 modifies, for a portion of the static travel path in which the dynamic travel path has been reflected at the above-described S7, the speed plan for the vehicle created at the above-described S4, based on information on the reflected dynamic travel path. Note that when there is no change in the static travel path generated at the above-described S3 as a result of reflecting the dynamic travel path, the process at S8 may be omitted.

Subsequently, at S9, the CPU 51 computes the amounts of control for the vehicle to travel along the static travel path generated at the above-described S3 (when the dynamic travel path is reflected at the above-described S7, a path obtained after the reflection) at a speed in accordance with the speed plan created at the above-described S4 (when the speed plan is modified at the above-described S8, a plan obtained after the modification). Specifically, each of the amounts of control for an accelerator, a brake, a gear, and steering is computed. Note that the processes at S9 and S10 may be performed by the vehicle control ECU 40 that controls the vehicle, instead of the navigation device 1.

Thereafter, at S10, the CPU 51 reflects the amounts of control computed at S9. Specifically, the computed amounts of control are transmitted to the vehicle control ECU 40 through the CAN. The vehicle control ECU 40 performs vehicle control of each of the accelerator, brake, gear, and steering based on the received amounts of control. As a result, it becomes possible to perform travel assistance control for traveling along the static travel path generated at the above-described S3 (when the dynamic travel path is reflected at the above-described S7, a path obtained after the reflection) at a speed in accordance with the speed plan created at the above-described S4 (when the speed plan is modified at the above-described S8, a plan obtained after the modification).

Then, at S11, the CPU 51 determines whether the vehicle has traveled a certain distance since the generation of a static travel path at the above-described S3. For example, the certain distance is 1 km.

Then, if it is determined that the vehicle has traveled a certain distance since the generation of a static travel path at the above-described S3 (S11: YES), then processing returns to S1. Thereafter, a static travel path is generated again, targeting a section within a predetermined distance from a current location of the vehicle along a planned travel route (S1 to S4). Note that, in the present embodiment, every time the vehicle has traveled a certain distance (e.g., 1 km), a static travel path is repeatedly generated targeting a section within a predetermined distance from a current location of the vehicle along a planned travel route, but when a distance to a destination is short, static travel paths to the destination may be generated all at once at the time of starting traveling.

On the other hand, if it is determined that the vehicle has not traveled a certain distance since the generation of a static travel path at the above-described S3 (S11: NO), then it is determined whether to terminate the assistance travel by autonomous driving assistance (S12). A case of terminating the assistance travel by autonomous driving assistance is not only a case in which the vehicle has reached the destination, but also a case in which the travel by autonomous driving assistance is intentionally canceled (override) by the user operating an operation panel provided on the vehicle or performing a steering wheel operation, a brake operation, etc.

Then, if it is determined to terminate the assistance travel by autonomous driving assistance (S12: YES), then the autonomous driving assistance program is terminated. On the other hand, if it is determined to continue the assistance travel by autonomous driving assistance (S12: NO), then processing returns to S5.

Next, a subprocess of the static travel path generating process performed at the above-described S3 will be described based on FIG. 6. FIG. 6 is a flowchart of a subprocess program of the static travel path generating process.

First, at S21, the CPU 51 obtains a current location of the vehicle detected by the current location detecting part 31. Note that it is desirable to specifically identify the current location of the vehicle using, for example, highly accurate GPS information or a highly accurate location technique. Here, the highly accurate location technique is a technique in which white lines and road surface painting information captured with a camera installed on the vehicle are detected by image recognition, and furthermore, the detected white lines and road surface painting information are checked against, for example, the highly accurate map information 15, by which a driving lane and a highly accurate vehicle location can be detected. Furthermore, when the vehicle travels on a road having multiple lanes, a lane in which the vehicle travels is also identified.

Then, at S22, the CPU 51 obtains, based on the highly accurate map information 15 obtained at the above-described S2, lane configurations, section line information, information about intersections, etc., targeting a section ahead of the vehicle in a traveling direction for which a static travel path is to be generated (e.g., inside a secondary mesh including the current location of the vehicle). Note that the lane configurations and section line information obtained at the above-described S22 include, for example, information that identifies the number of lanes, lane widths, how the number of lanes increases or decreases at which location when there is an increase or decrease in the number of lanes, and a passage segment in a traveling direction for each lane and a connection between roads for each lane (specifically, a correspondence between a lane included in a road taken before passing through an intersection and a lane included in a road taken after passing through the intersection). In addition, the information about intersections includes information about the locations and shapes of ground objects disposed at the intersections, in addition to the configurations of the intersections. Furthermore, the "ground objects disposed at the intersections" include road surface markings painted on road surfaces, such as guidelines (white guidelines) and rhombic guide zones (diamond-shaped markings) disposed at the center of the intersections, and structures such as poles.

Subsequently, at S23, the CPU 51 constructs a lane network, targeting the section ahead of the vehicle in the traveling direction for which a static travel path is to be generated, based on the lane configurations and section line information obtained at the above-described S22. Here, the lane network is a network representing movement into a lane that can be selected by the vehicle.

Figure 7:
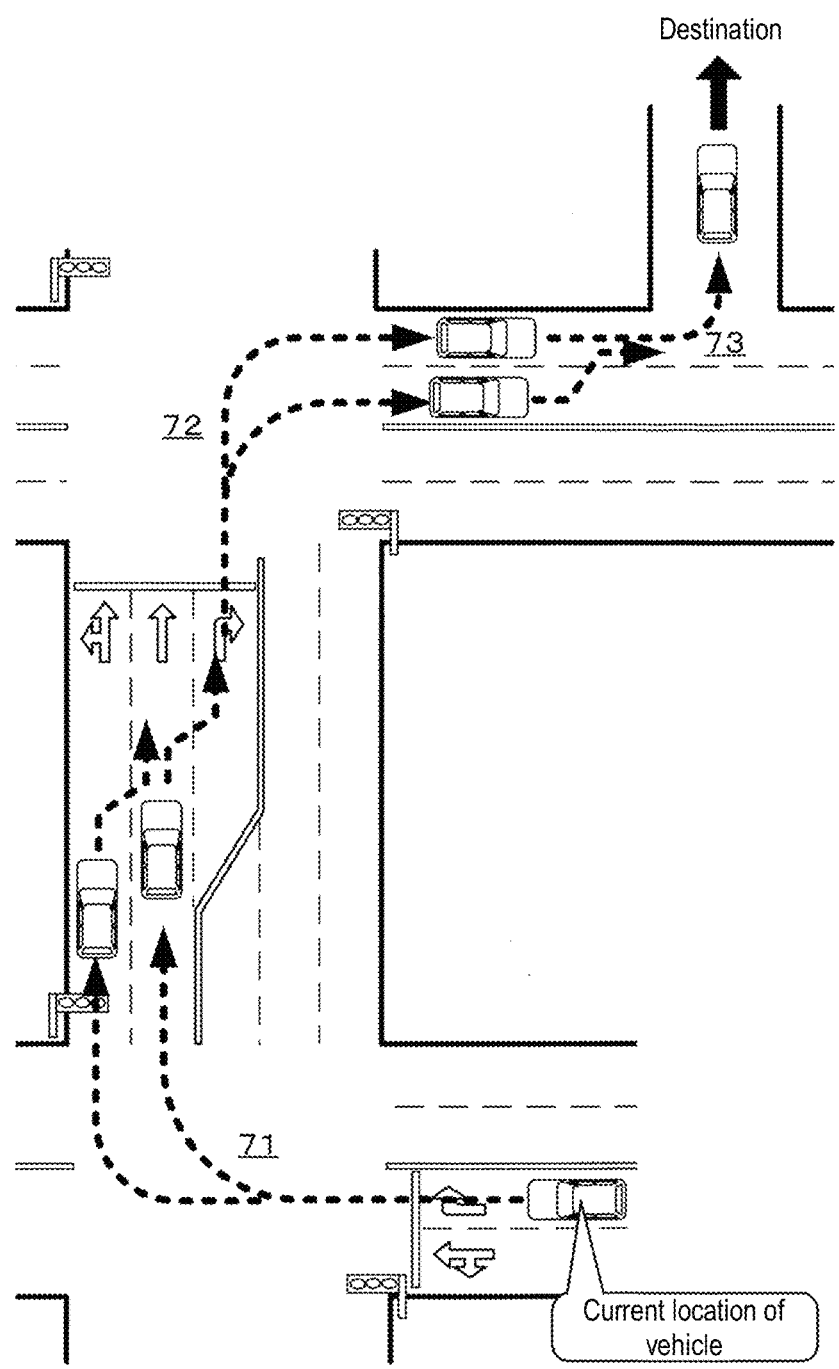
FIG. 7 is a diagram showing an example of a planned travel route of a vehicle.

Here, as an example of constructing a lane network at the above-described S23, for example, an example case will be described in which the vehicle travels along a planned travel route shown in FIG. 7. The planned travel route shown in FIG. 7 is a route where after the vehicle travels straight ahead from its current location, the vehicle turns right at a next intersection 71, and further turns right at a next intersection 72, too, and turns left at a next intersection 73. In the planned travel route shown in FIG. 7, for example, when the vehicle turns right at the intersection 71, the vehicle can enter a right lane and can also enter a left lane. Note, however, that since the vehicle needs to turn right at the next intersection 72, the vehicle needs to move into the far right lane at the time of entering the intersection 72. In addition, when the vehicle turns right at the intersection 72, too, the vehicle can enter a right lane and can also enter a left lane. Note, however, that since the vehicle needs to turn left at the next intersection 73, the vehicle needs to move into the far left lane at the time of entering the intersection 73. A lane network constructed targeting a section that allows such movement into a lane is shown in FIG. 8.

Figure 8:
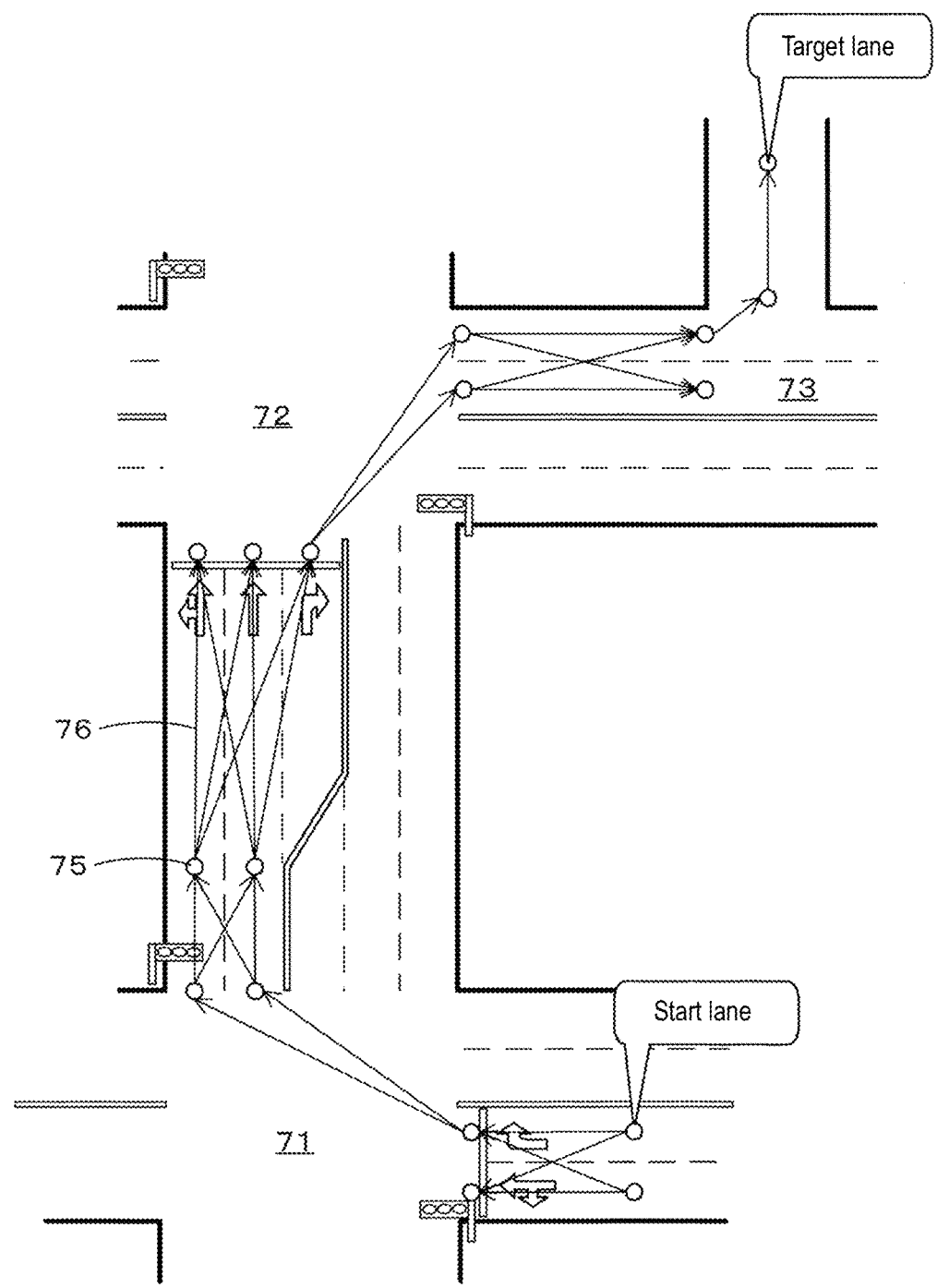
FIG. 8 is a diagram showing an example of a lane network constructed for the planned travel route shown in FIG. 7.

As shown in FIG. 8, the lane network divides a section ahead of the vehicle in a traveling direction for which a static travel path is to be generated into a plurality of segments (groups). Specifically, the division is performed such that a location where the vehicle enters an intersection, a location where the vehicle exits the intersection, and a location where the number of lanes increases or decreases serve as boundaries. A node point (hereinafter, referred to as lane node) 75 is set at a portion of each lane located at a boundary of each divided segment. Furthermore, a link (hereinafter, referred to as lane link) 76 that connects lane nodes 75 is set.

In addition, the above-described lane network includes information that identifies, by particularly a connection between lane nodes and a lane link at an intersection, a correspondence between a lane included in a road taken before passing through the intersection and a lane included in a road taken after passing through the intersection, i.e., between a lane taken before passing through the intersection and a lane into which the vehicle can move after passing through the intersection. Specifically, the lane network indicates that the vehicle can move between lanes corresponding to lane nodes that are connected by a lane link among lane nodes set on a road taken before passing through an intersection and lane nodes set on a road taken after passing through the intersection.

Figure 9:
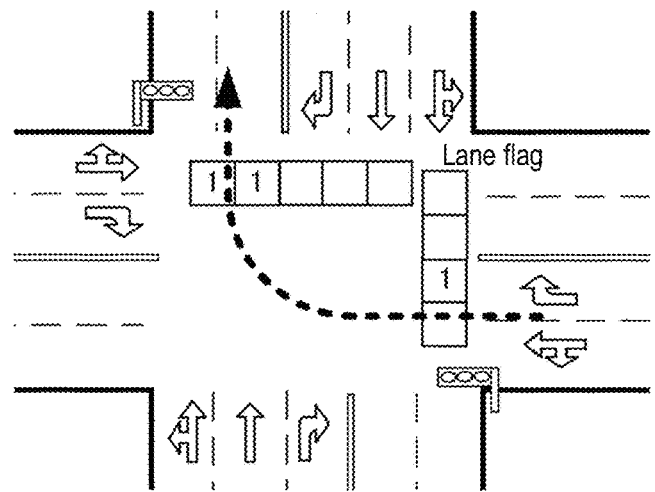
FIG. 9 is a diagram showing an example of lane flags indicating a correspondence between a lane included in a road taken before passing through an intersection and a lane included in a road taken after passing through the intersection.
Figure 9:
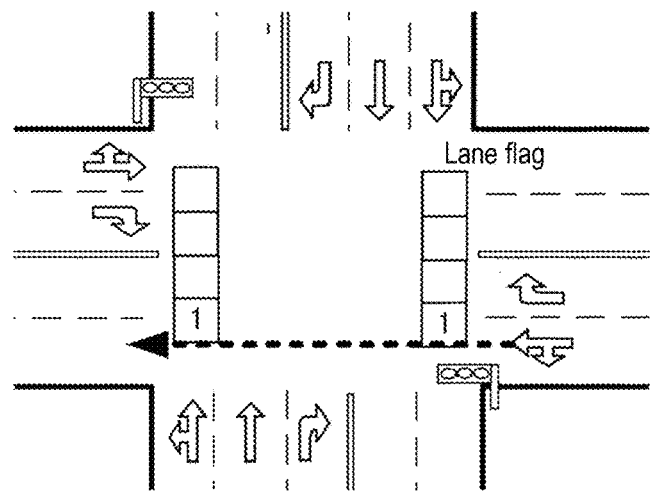
Figure 9:
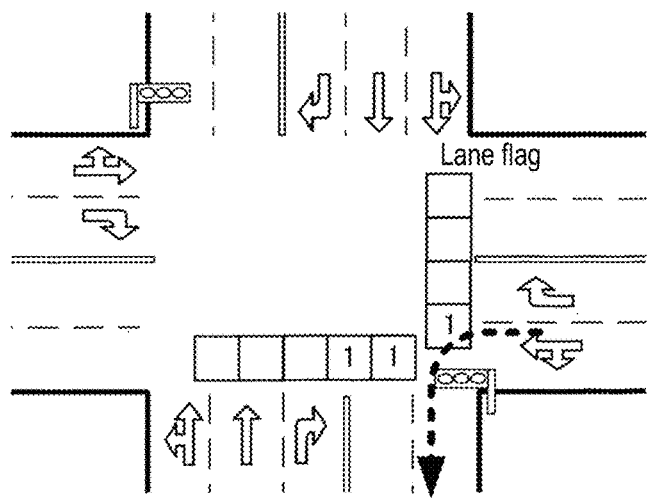

To generate such a lane network, the highly accurate map information 15 stores, for each road connected to an intersection, lane flags indicating a correspondence between lanes and set for each combination of a road that enters the intersection and a road that exits the intersection. For example, FIG. 9 shows lane flags set for a case in which the vehicle enters an intersection from a road on the right side and exits to a road on the upper side, lane flags set for a case in which the vehicle enters an intersection from a road on the right side and exits to a road on the left side, and lane flags set for a case in which the vehicle enters an intersection from a road on the right side and exits to a road on the lower side. The lane flags indicate that a lane whose lane flag is set to "1" among lanes included in a road taken before passing through an intersection is associated with a lane whose lane flag is set to "1" among lanes included in a road taken after passing through the intersection, i.e., the lanes whose lane flags are set to "1" are lanes between which the vehicle can move before and after passing through the intersection. Upon constructing a lane network at the above-described S23, the CPU 51 forms a connection between lane nodes and a lane link at an intersection by referring to the lane flags.

Then, at S24, in the lane network constructed at the above-described S23, the CPU 51 sets a start lane in which the vehicle starts to move, at a lane node located at a starting point of the lane network, and sets a target lane which is a target for the vehicle to move, at a lane node located at an end point of the lane network. Note that when the starting point of the lane network is on a road with multiple lanes in each direction, a lane node corresponding to a lane in which the vehicle is currently located serves as a start lane. On the other hand, when the end point of the lane network is on a road with multiple lanes in each direction, a lane node corresponding to the far left lane (in a case of driving on the left) serves as a target lane.

Thereafter, at S25, the CPU 51 searches for routes that continuously connect the start lane to the target lane, by referring to the lane network constructed at the above-described S23, and derives one route (hereinafter, referred to as reference route). For example, a route search is performed from a target-lane side, using Dijkstra's algorithm. Note, however, that search means other than Dijkstra's algorithm may be used if the search means can search a route that continuously connects the start lane to the target lane. Note that the reference route derived at the above-described S25 does not necessarily need to be an optimal route, and may be any route that continuously connects the start lane to the target lane.

Figure 10:
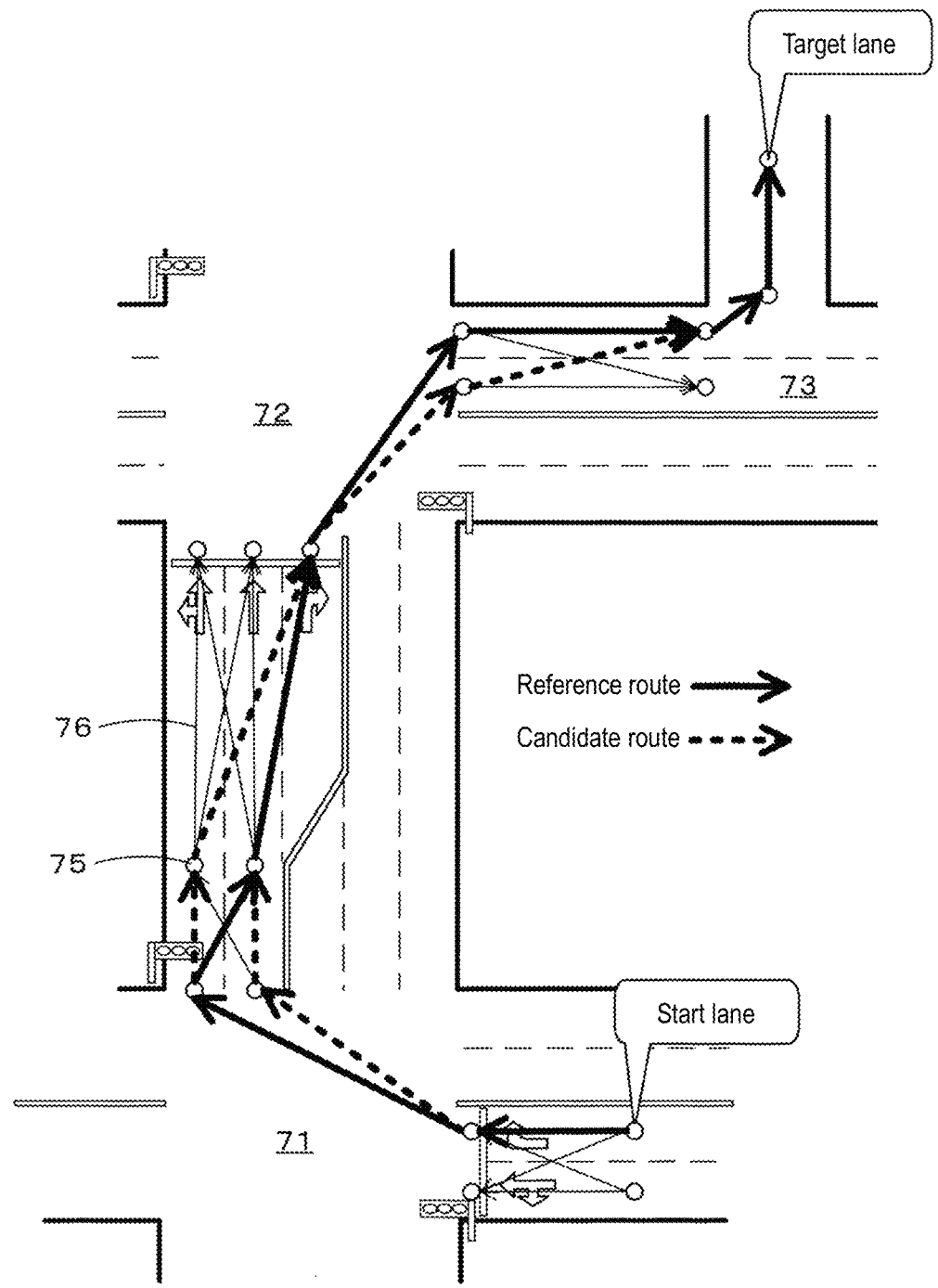
FIG. 10 is a diagram showing a reference route and a candidate route.

Subsequently, at S26, based on the reference route identified at the above-described S25, the CPU 51 derives another route that continuously connects the start lane to the target lane (hereinafter, referred to as candidate route). For example, when the vehicle follows the reference route from a start-lane side and reaches a segment in which a lane change can be made or an intersection at which a left or right turn is to be made, a new route different from the reference route diverges, by which another route is generated. As a result, as shown in FIG. 10, one reference route and one or a plurality of candidate routes are generated Thereafter, at S27, the CPU 51 performs a lane change location setting process (FIG. 16) which will be described later. Here, the lane change location setting process is a process of setting specific locations where a lane change is made (hereinafter, referred to as lane change locations), for a route involving a lane change among the reference route and the candidate route generated at the above-described S25 and S26. Note that when the reference route and the candidate route generated at the above-described S25 and S26 are routes with no lane changes, the process at S27 may be omitted.

Subsequently, at S28, for the reference route and the candidate route generated at the above-described S25 and S26, the CPU 51 adds lane nodes 75 to the lane change locations set at the above-described S27. Here, the lane change locations include a lane change start point at which a lane change starts, and a lane change end point at which the lane change ends. At S28, a lane node 75 is added to each of the lane change start point and the lane change end point.

Figure 11:
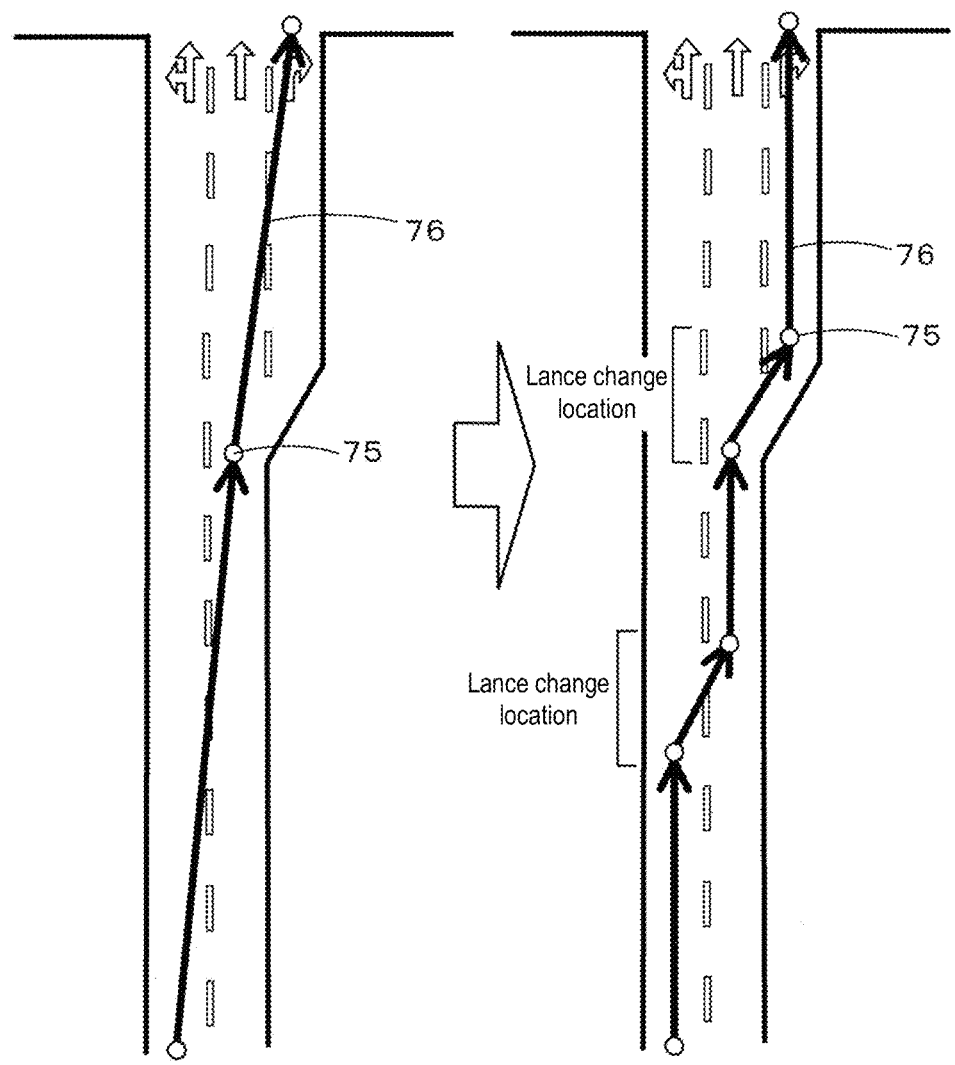
FIG. 11 is a diagram showing a reference route and a candidate route, taking into account set lane change locations.
Figure 12:
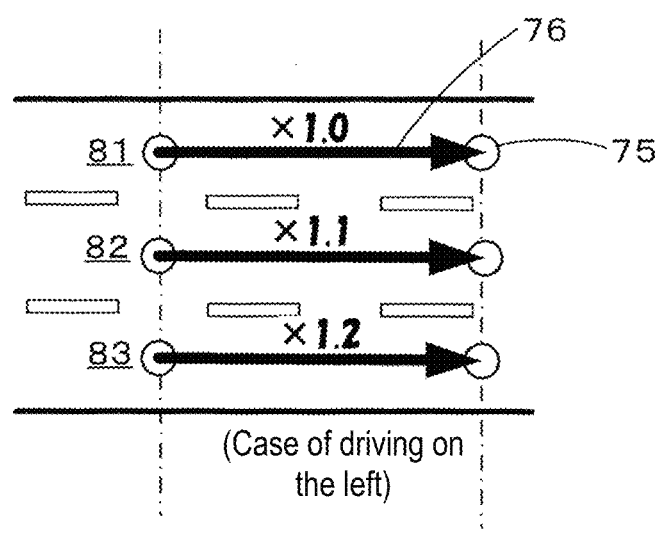
FIG. 12 is a diagram showing a relationship between lanes in which the vehicle travels and lane costs.

In addition, along with the addition of the lane nodes, a lane link 76 that connects the lane nodes 75 is also added. In addition, lane links other than those for lane change locations are basically straight lines (having a shape along a lane). As a result, as shown in FIG. 11, the reference route and the candidate route show a more specific way of moving into a lane in which the lane change locations set at the above-described S27 are identified. Note that when the reference route and the candidate route generated at the above-described S25 and S26 are routes with no lane changes, the process at S28 may be omitted.

Then, at S29, for the reference route and the candidate route which are generated at the above-described S25 and S26, and in which lane change locations are set at the above-described S27, and to which lane nodes and lane links are further added at the above-described S28, the CPU 51 calculates, for each route, a total of lane costs, taking into account the set lane change locations. Then, the total values of lane costs for each route are compared with each other, and a route with the minimum total value of lane costs is identified as a way of moving into a lane for the vehicle that is recommended when the vehicle moves.

Here, a lane cost is assigned to each lane link 76, and at S29, a total value of lane costs of all lane links 76 included in each route is calculated, and the total values are compared with each other. In addition, a lane cost assigned to each lane link 76 uses the length of each lane link 76 as a reference value. Then, the reference value is corrected using the following condition (1). Furthermore, for a route including lane changes, a cost (hereinafter, referred to as lane change cost) that is calculated using condition (2) based on the locations and number of the included lane changes is added to a total value of lane costs. Note that basically, lane links 76 in the same segment (group) are considered to have the same length (i.e., an increase in distance by a lane change is ignored). In addition, the length of a lane link 76 in an intersection is considered to be 0 or a fixed value.

(1) For a lane cost of a lane link of a road having multiple lanes, the reference value is multiplied by a coefficient, according to the location of a lane in which the vehicle travels. Specifically, a correction is made such that a lane link that travels in a passing lane has a higher lane cost than a lane link that travels in a driving lane. As a result, a larger total value of lane costs is calculated for a route with a longer distance to travel in a passing lane, and thus, such a route is less likely to be selected as a recommended way of moving into a lane, and a route with a short distance to travel in a passing lane is selected on a priority basis as a recommended way of moving into a lane. Note that for a road with no "driving lane" or "passing lane" segment, in countries that drive on the left, a correction is made such that a lane link that travels in a lane located on the right side has a higher lane cost. For example, for a road with three lanes in each direction as shown in FIG. 11, for a lane link that travels in a far left lane 81, the lane cost is multiplied by 1.0. For a lane link that travels in a middle lane 82, the lane cost is multiplied by 1.1. For a lane link that travels in a far right lane 83, the lane cost is multiplied by 1.2. On the other hand, in countries that drive on the right, a correction is made in a reverse manner such that a lane link that travels in a lane located on the left side has a higher lane cost.

(2) Upon calculating a lane change cost, first, a location that is recommended to make a lane change is obtained as a lane change recommended location. Here, in the present embodiment, based on the premise that a lane change included in a route is a lane change made to pass through a divergence point, a lane change recommended location is set with reference to a divergence point that causes a lane change. Specifically, a lane change recommended location is determined by the road type of a road that enters a divergence point (i.e., the road type of a road on which a lane change is made), and for example, for an inter-city expressway, a lane change recommended location is set at a location 2000 m before a divergence point. For an urban expressway, a lane change recommended location is set at a location 1000 m before a divergence point. For other general roads and narrow streets, a lane change recommended location is set at a location 700 m before a divergence point. Then, when a distance from the divergence point to the lane change recommended location is L and a distance from the divergence point to a lane change location set at the above-described S27 (more specifically, a lane change start point) is X, a lane change cost C is calculated by the following equation (a):

$$C = |1 - X/L| \times K \text{(constant)} \qquad \text{(a)}$$

Note that the value "K" can be set as appropriate, but is set to, for example, 200. For a route including a plurality of lane changes, the above-described lane change cost is calculated for each of the included lane changes, and the calculated lane change costs are added to a total value of lane costs.

Figure 13:
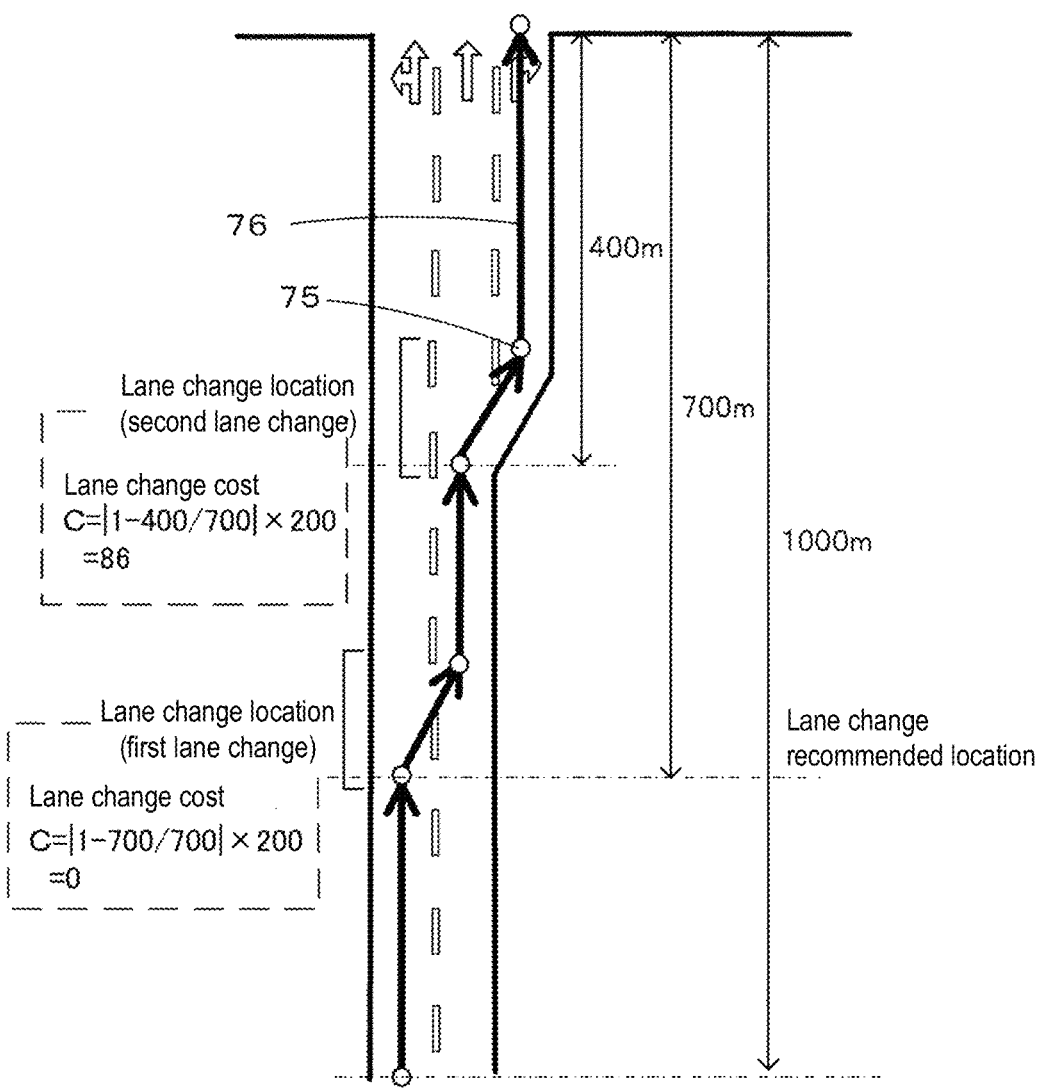
FIG. 13 is a diagram showing an example of a method of calculating a lane change cost.

A method of calculating a lane change cost will be described using, as an example, a route where, for example, as shown in FIG. 13, two lane changes are made before a divergence point at which a right turn is to be made. In the example shown in FIG. 13, for the first lane change far from the divergence point, the distance from the divergence point to a lane change location is 700 m and the distance from the divergence point to a lane change recommended location is also 700 m, and thus, the lane change cost is "0". On the other hand, for the second lane change close to the divergence point, the distance from the divergence point to a lane change location is 400 m and the distance from the divergence point to the lane change recommended location is 700 m, and thus, the lane change cost is about "86". Thus, for the route shown in FIG. 13, "0" and "86" are added as lane change costs to a total value of lane costs. According to the above-described equation (a), the lane change cost decreases as the lane change location set for a route at the above-described S 27 gets closer to the lane change recommended location, and thus, such a route is selected on a priority basis as a recommended way of moving into a lane. In addition, since the number of lane costs to be added is smaller for a route with a smaller number of lane changes, such a route is likewise selected on a priority basis as a recommended way of moving into a lane.

A method of calculating a total value of lane costs will be described using the route shown in FIG. 13 as an example. For an area from the divergence point to a point 1000 m before the divergence point, the lane cost of a portion from a point 1000 m before the divergence point to a point 700 m before the divergence point is 300 m×1.0=300, the lane cost of a portion from a point 700 m before the divergence point to a point 400 m before the divergence point is 300 m×1.1=330, and the lane cost of a portion from a point 400 m before the divergence point to the divergence point is 400 m×1.2=480. Then, by adding the above-described lane change costs "0" and "86" to those lane costs, the final total value of lane costs results in "1196". Note that in practice, a total value of lane costs is calculated targeting not only the area from the divergence point to a point 1000 m before the divergence point, but also the entire reference route and the entire candidate route which are generated at the above-described S25 and S26.

Meanwhile, a method of calculating a total value of lane costs will be described using, as an example, a route shown in FIG. 14 which is another route for the same section as in FIG. 13. For an area from the divergence point to a point 1000 m before the divergence point, the lane cost of a portion from a point 1000 m before the divergence point to a point 400 m before the divergence point is 600 m×1.0=600, the lane cost of a portion from a point 400 m before the divergence point to a point 200 m before the divergence point is 200 m×1.1=220, and the lane cost of a portion from a point 200 m before the divergence point to the divergence point is 200 m×1.2=240. In addition, in the example shown in FIG. 14, for the first lane change far from the divergence point, the distance from the divergence point to a lane change location is 400 m and the distance from the divergence point to a lane change recommended location is 700 m, and thus, the lane change cost is "86". On the other hand, for the second lane change close to the divergence point, the distance from the divergence point to a lane change location is 200 m and the distance from the divergence point to the lane change recommended location is 700 m, and thus, the lane change cost is about "143". Then, by adding the above-described lane change costs "86" and "143" to the lane costs, the final total value of lane costs results in "1269".

Figure 14:
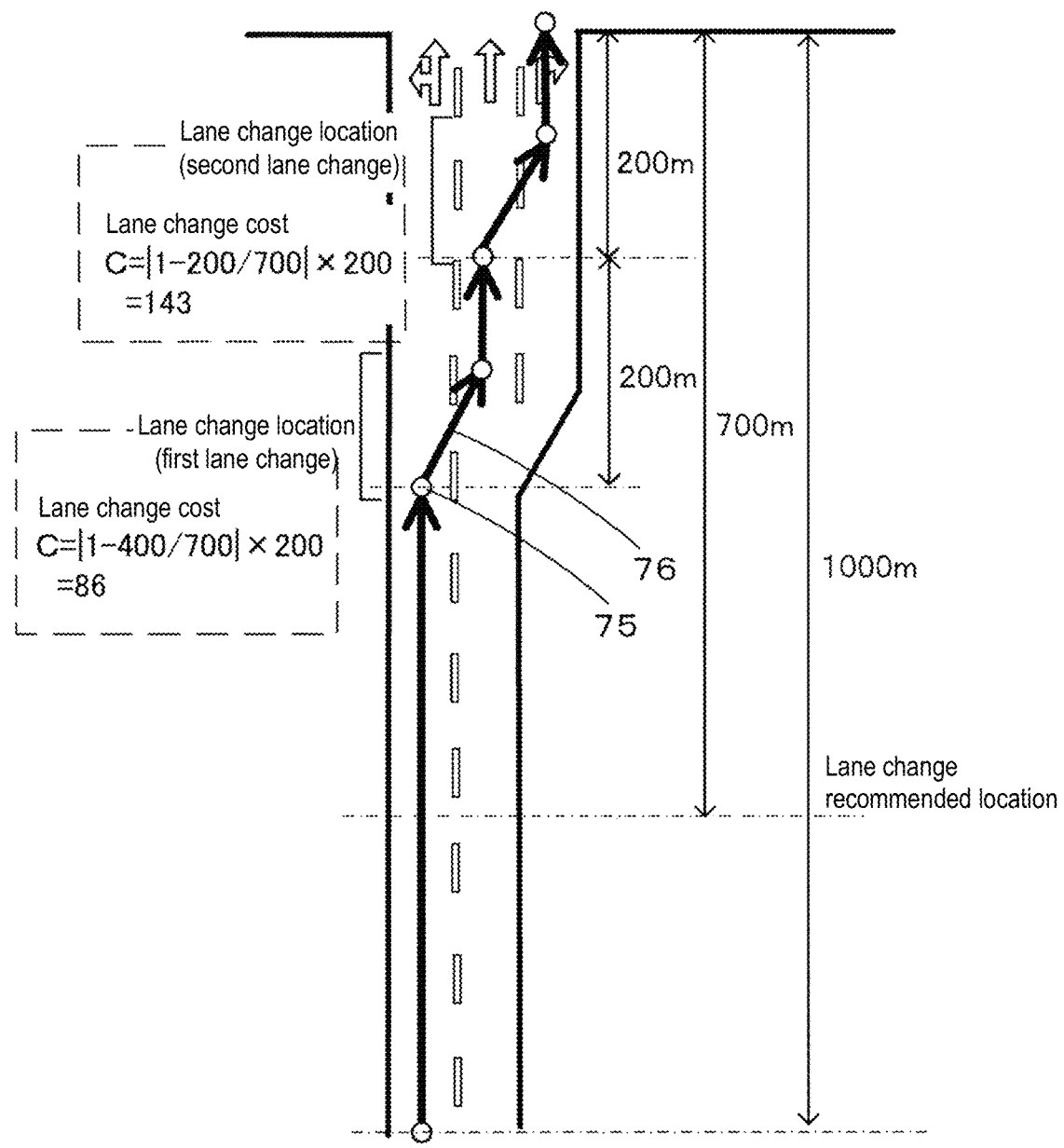
FIG. 14 is a diagram showing an example of a method of calculating a lane change cost.

Thus, when the route shown in FIG. 13 is compared with the route shown in FIG. 14, for the area from the divergence point to a point 1000 m before the divergence point, the route shown in FIG. 13 has a smaller total value of lane costs, which indicates that the route shown in FIG. 13 is more likely to be selected as a recommended way of moving into a lane.

Then, at S30, the CPU 51 calculates a recommended travel path targeting, particularly, a segment (group) in which the lane change locations are set at the above-described S27, for a case in which the vehicle moves into a lane in accordance with the route selected at the above-described S29. Note that when the route selected at the above-described S29 is a route with no lane changes, the process at S30 may be omitted.

Specifically, the CPU 51 calculates a travel path using map information, etc., for the lane change locations set at the above-described S27. For example, lateral acceleration (lateral G) occurring when the vehicle makes a lane change is calculated from vehicle speed (a speed limit for a corresponding road) and lane width, and on conditions that the lateral G does not interfere with autonomous driving assistance and does not exceed an upper limit value (e.g., 0.2 G) at which a passenger of the vehicle is not given discomfort, a path that connects a lane change start point to a lane change end point as smooth as possible is calculated using a clothoid curve. Note that the clothoid curve is a curve formed by a vehicle's trajectory when the vehicle has a constant travel speed and the steering is turned at constant angular speed.

Then, at S31, the CPU 51 calculates a recommended travel path targeting, particularly, a segment (group) in an intersection, for a case in which the vehicle moves into a lane in accordance with the route selected at the above-described S29. Note that when the route selected at the above-described S29 is a route that does not pass through any intersection, the process at S31 may be omitted.

Figure 15:
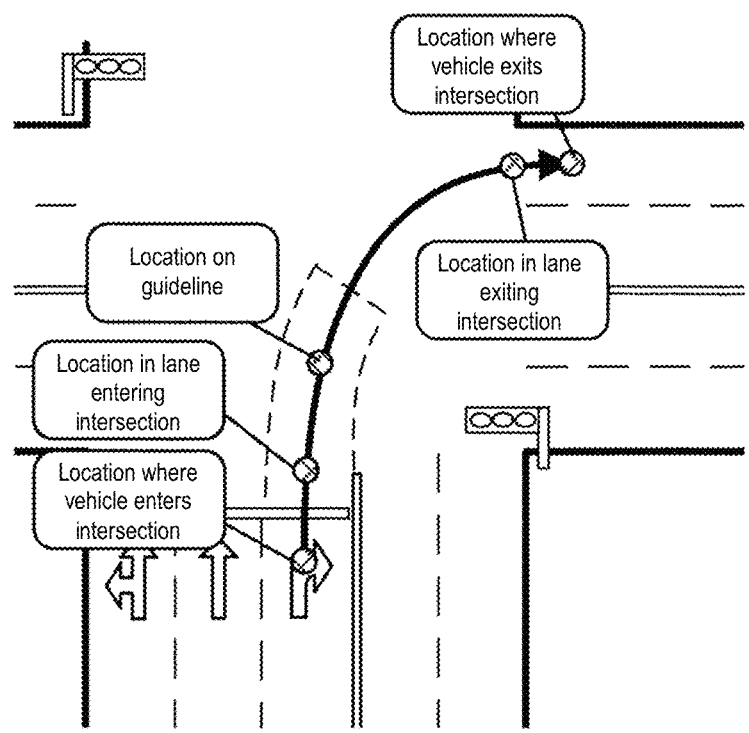
FIG. 15 is a diagram that describes a method of calculating a static travel path in an intersection.

For example, FIG. 15 describes an example case in which a travel path is calculated targeting a segment (group) in an intersection that is set with a route for movement into a lane in which the vehicle enters the intersection from the far right lane and thereafter exits to the far left lane. First, the CPU 51 marks locations in the intersection through which the vehicle is to pass. Specifically, each of a location in a lane entering the intersection, a location where the vehicle enters the intersection, a location on a guideline in the intersection (only when there is a guideline), a location where the vehicle exits the intersection, and a lane exiting the intersection is marked. When there is a rhombic guide zone (diamond-shaped marking) at the center of the intersection, marking is performed taken also into account the diamond-shaped marking. Then, a curve that passes through all of the marked marks is calculated as a travel path. More specifically, the marks are connected by a spline curve and then a clothoid curve that approximates the connected curve is calculated as a travel path. Note that the clothoid curve is a curve formed by a vehicle's trajectory when the vehicle has a constant travel speed and the steering is turned at constant angular speed.

Thereafter, at S32, the CPU 51 connects the travel paths calculated at the above-described S30 and S31, thereby generating a static travel path which is a travel path along which the vehicle is recommended to travel on roads included in the planned travel route. Note that for a segment that is neither a segment in which a lane change is made nor a segment in an intersection, a path that passes through the center of a lane is a travel path along which the vehicle is recommended to travel.

Then, the static travel path generated at the above-described S32 is stored in the flash memory 54, etc., as assistance information used for autonomous driving assistance.

Figure 16:
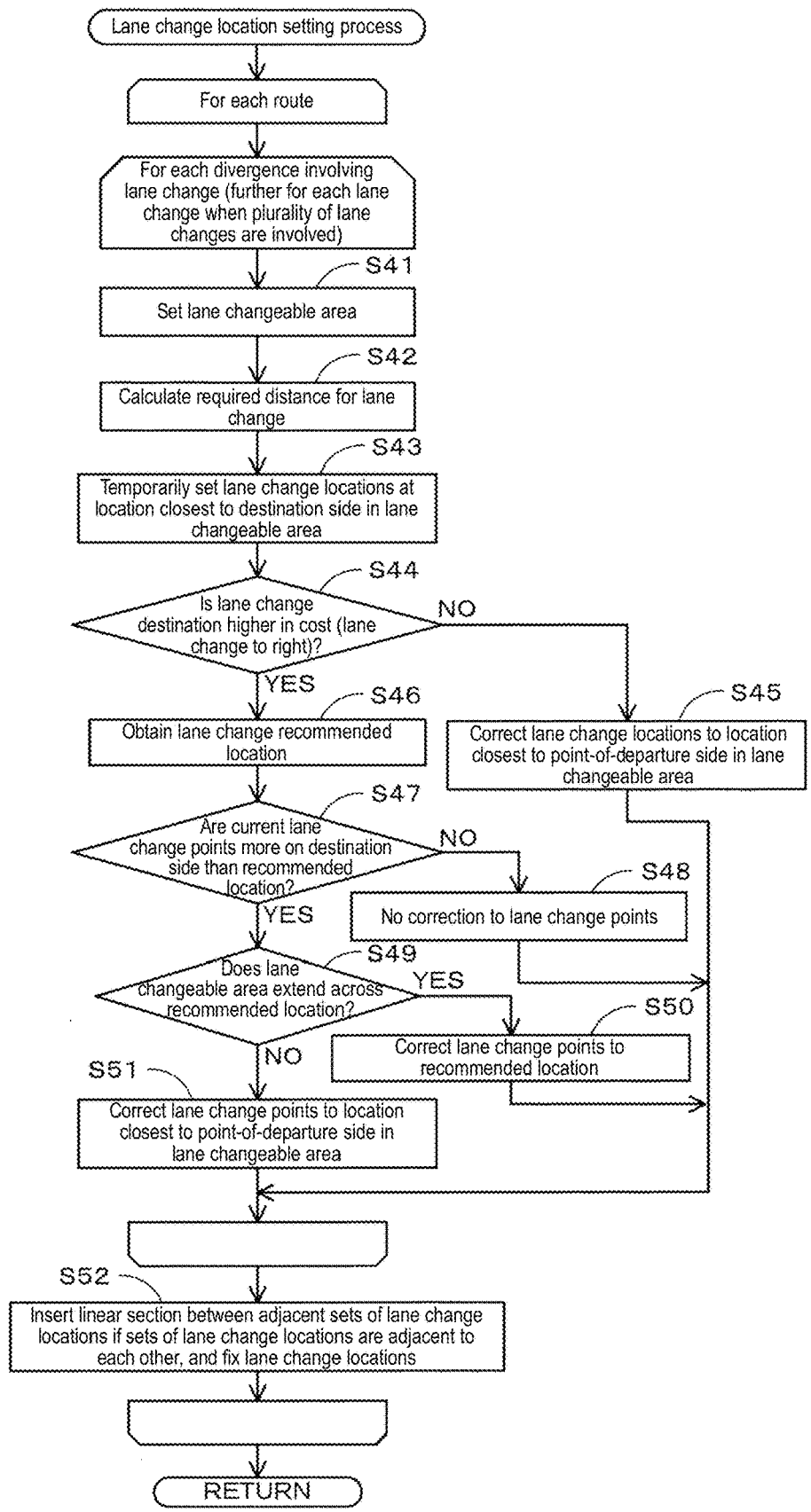
FIG. 16 is a flowchart of a subprocess program of a lane change location setting process.

Next, a subprocess of the lane change location setting process performed at the above-described S27 will be described based on FIG. 16. FIG. 16 is a flowchart of a subprocess program of the lane change location setting process.

Note that the following lane change location setting process is performed for each of the reference route and the candidate route which are generated at the above-described S25 and S26 and for each "divergence point for which a lane change is made to pass therethrough (a divergence point involving a lane change)" included in each route. Note that as described above, in the present embodiment, it is premised that a lane change included in a route is a lane change made to pass through a divergence point. Thus, for a route with a plurality of "divergence points for which a lane change is made to pass therethrough", the lane change location setting process is performed for each of the plurality of divergence points. Note that for a divergence point for which a plurality of lane changes are made to pass therethrough, the lane change location setting process is further performed for each of the plurality of lane changes.

First, at S41, the CPU 51 sets, with reference to a divergence point which is a processing target, a lane changeable area which is an area in which a lane change made for the divergence point can be made. Specifically, by referring to the lane network constructed at the above-described S23, a lane node 75 at an end point of a segment (group) including a corresponding lane change serves as an end point of a lane changeable area. On the other hand, a starting point of the lane changeable area is a lane node closest to a point-of-departure side at which a lane change can be made.

Figure 17:
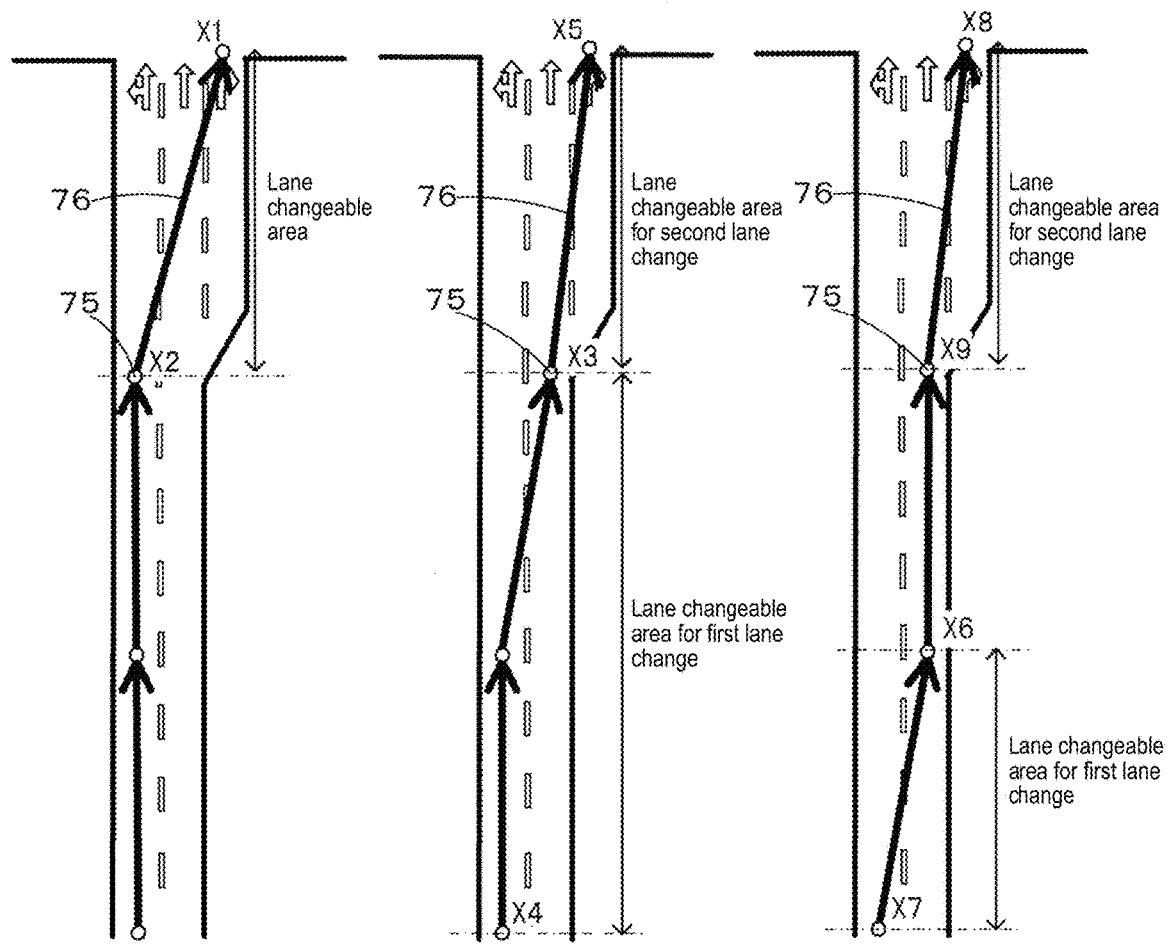
FIG. 17 is a diagram showing lane changeable areas.

For example, for a route where, as shown in a drawing on the left of FIG. 17, a lane change is made from the far left lane to the right by two lanes in a segment (group) closest to a divergence point at which a right turn is to be made, a lane node X1 at an end point of the segment (group) including the lane change serves as an end point of a lane changeable area. On the other hand, a lane node X2 which is closest to a point-of-departure side and at which a lane change can be made from the far left lane to the right by two lanes serves as a starting point of the lane changeable area.

On the other hand, for a route where, as shown in a drawing in the middle of FIG. 17, a lane change is made from the far left lane to the right by one lane in a segment (group) which is the second closest to a divergence point at which a right turn is to be made, and a lane change is made from a middle lane to the right by one lane in a segment (group) closest to the divergence point, first, a lane node X3 at an end point of the segment (group) including the first lane change serves as an end point of a lane changeable area for the first lane change. On the other hand, a lane node X4 which is closest to a point-of-departure side and at which a lane change can be made from the far left lane to the right by one lane serves as a starting point of the lane changeable area for the first lane change. Note, however, that for the starting point of the lane changeable area for the first lane change, a lane node at a starting point of the segment (group) including the lane change may be used. In addition, a lane node X5 at an end point of the segment (group) including the second lane change serves as an end point of a lane changeable area for the second lane change. On the other hand, the lane node X3 which is closest to the point-of-departure side and at which a lane change can be made from the middle lane to the right by one lane serves as a starting point of the lane changeable area for the second lane change.

In addition, for a route where, as shown in a drawing on the right of FIG. 17, a lane change is made from the far left lane to the right by one lane in a segment (group) which is the third closest to a divergence point at which a right turn is to be made, and a lane change is made from a middle lane to the right by one lane in a segment (group) closest to the divergence point, first, a lane node X6 at an end point of the segment (group) including the first lane change serves as an end point of a lane changeable area for the first lane change. On the other hand, a lane node X7 which is closest to a point-of-departure side and at which a lane change can be made from the far left lane to the right by one lane serves as a starting point of the lane changeable area for the first lane change. In addition, a lane node X8 at an end point of the segment (group) including the second lane change serves as an end point of a lane changeable area for the second lane change. On the other hand, a lane node X9 which is closest to the point-of-departure side and at which a lane change can be made from the middle lane to the right by one lane serves as a starting point of the lane changeable area for the second lane change. Note that the lane nodes X1 to X9 are identified by referring to the lane network constructed at the above-described S23.

Then, at S42, the CPU 51 calculates a distance required to make a lane change (hereinafter, a required distance for a lane change), using map information around the divergence point which is a processing target, vehicle information, etc. Note that the required distance for a lane change is a distance in a traveling direction (a distance in a road length direction). For example, lateral acceleration (lateral G) occurring when the vehicle makes a lane change is calculated from vehicle speed (a speed limit for a corresponding road) and lane width, and on conditions that the lateral G does not interfere with autonomous driving assistance and does not exceed an upper limit value (e.g., 0.2 G) at which a passenger of the vehicle is not given discomfort, a path that is as smooth as possible and that has the shortest possible distance required for a lane change is calculated using a clothoid curve. Note that the clothoid curve is a curve formed by a vehicle's trajectory when the vehicle has a constant travel speed and the steering is turned at constant angular speed. Then, based on the calculated path, a required distance for a lane change is calculated.

Figure 18:
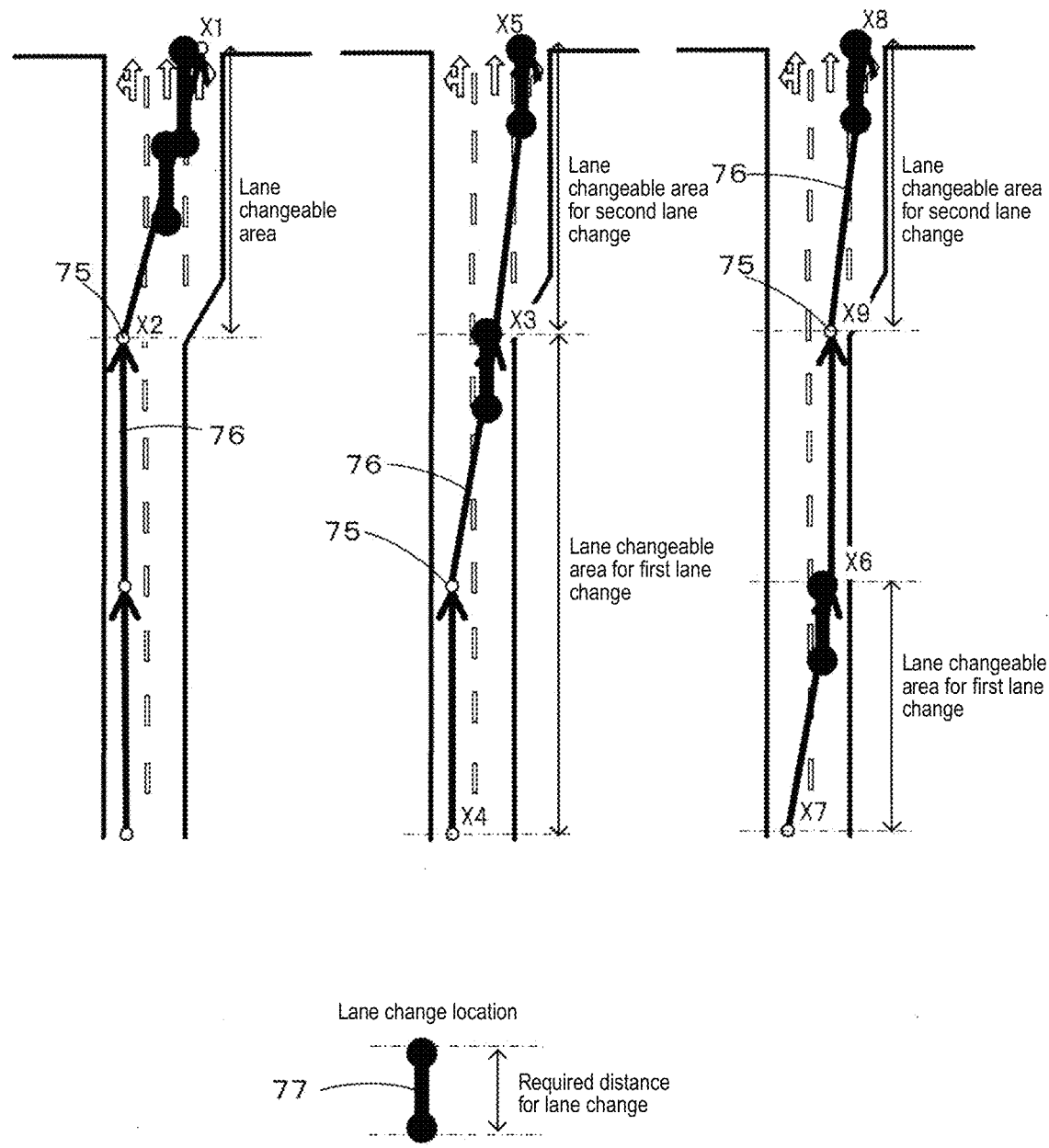
FIG. 18 is a diagram showing a state in which lane change locations are temporarily set for routes.

Subsequently, at S43, the CPU 51 temporarily sets, for the route which is a processing target, locations (lane change locations) at which a lane change made to pass through a divergence point which is a processing target is made. Specifically, lane change locations are temporarily set at a location closest to a destination side in the lane changeable area set at the above-described S41. For example, FIG. 18 is a diagram showing a state in which lane change locations are temporarily set for each route shown in FIG. 17. Lane change locations are set by a line segment 77 having the length of the required distance for a lane change which is calculated at the above-described S42, and an endpoint on a point-of-departure side of the line segment 77 corresponds to a lane change start point at which a lane change starts, and an endpoint on a destination side corresponds to a lane change end point at which the lane change ends. At S43, lane change locations are temporarily set such that a lane change end point is located at an end point of a lane changeable area.

Note that the lane change locations which are temporarily set at the above-described S44 are corrected when a predetermined condition is satisfied as will be described later, but if a correction is not made, then basically, the temporarily set lane change locations are fixed. Namely, in the present embodiment, lane change locations are set at a location close to the destination on a priority basis.

Thereafter, at S44, the CPU 51 determines whether a lane change made to pass through the divergence point which is a processing target is a lane change to a lane with a higher lane cost than a current lane. As described above, for a lane cost, a larger value is set for a passing lane than a driving lane. In addition, in countries that drive on the left, a larger value is set for a more rightward lane. Namely, at the above-described S44, in countries that drive on the left, it is determined whether a lane change is made to the right.

Then, if it is determined that a lane change made to pass through the divergence point which is a processing target is a lane change to a lane with a higher lane cost than a current lane (S44: YES), then processing transitions to S46. On the other hand, if it is determined that a lane change made to pass through the divergence point which is a processing target is a lane change to a lane with a lower lane cost than a current lane (S44: NO), then processing transitions to S45.

At S45, the CPU 51 corrects the lane change locations which are temporarily set at the above-described S43. Specifically, the lane change locations are moved to a location closest to the point-of-departure side in the lane changeable area set at the above-described S41. A reason that the lane change locations are moved to the point-of-departure side is that it is appropriate to make a lane change to move into a lane with a low cost at the earliest possible timing. Thereafter, the processes at and after the above-described S41 are performed for another divergence point included in the route which is a processing target, and then processing transitions to S52.

On the other hand, at S46, the CPU 51 obtains, for the divergence point which is a processing target, a location that is recommended to make a lane change, as a lane change recommended location. Here, in the present embodiment, based on the premise that a lane change included in a route is a lane change made to pass through a divergence point, a lane change recommended location is set with reference to a divergence point that causes a lane change. For example, for a lane change to move into a right lane so as to make a right turn at a divergence point ahead in a traveling direction as shown in FIGS. 17 and 18, a lane change recommended location is set with reference to the divergence point at which a right turn is to be made. Specifically, a lane change recommended location is determined by the road type of a road that enters a divergence point (i.e., the road type of a road on which a lane change is made), and for example, for an inter-city expressway, a lane change recommended location is set at a location 2000 m before a divergence point. For an urban expressway, a lane change recommended location is set at a location 1000 m before a divergence point. For other general roads and narrow streets, a lane change recommended location is set at a location 700 m before a divergence point.

Then, at S47, the CPU 51 determines whether the lane change locations which are temporarily set at the above-described S43 are more on the destination side than the lane change recommended location obtained at the above-described S46.

Then, if it is determined that the lane change locations which are temporarily set at the above-described S43 are more on the destination side than the lane change recommended location obtained at the above-described S46 (S47: YES), then processing transitions to S49. On the other hand, if it is determined that the lane change locations which are temporarily set at the above-described S43 are more on the point-of-departure side than the lane change recommended location obtained at the above-described S46 (S47: NO), then processing transitions to S48.

At S48, the CPU 51 ends the process without correcting the lane change locations which are temporarily set at the above-described S43. Namely, a state in which the lane change locations are set at a location closest to the destination side in the lane changeable area is maintained. A reason that a correction is not made is that the temporarily set current lane change locations are already locations at which a lane change is made at the closest possible timing to the lane change recommended location. Thereafter, the processes at and after the above-described S41 are performed for another divergence point included in the route which is a processing target, and then processing transitions to S52.

On the other hand, at S49, the CPU 51 determines whether the lane changeable area set at the above-described S41 extends across the lane change recommended location obtained at the above-described S46 (i.e., the lane changeable area includes the lane change recommended location).

Then, if it is determined that the lane changeable area set at the above-described S41 extends across the lane change recommended location obtained at the above-described S46 (S49: YES), then processing transitions to S50. On the other hand, if the lane changeable area set at the above-described S41 does not extend across the lane change recommended location obtained at the above-described S46, i.e., a starting point of the lane changeable area is more on the destination side than the lane change recommended location (S49: NO), then processing transitions to S51.

At S50, the CPU 51 corrects the lane change locations which are temporarily set at the above-described S43. Specifically, the lane change locations are moved so as to approach the lane change recommended location set at the above-described S46. More specifically, the lane change locations are moved such that a lane change start point reaches a location where the lane change start point matches the lane change recommended location. A reason that the lane change locations are moved is that if a lance change can be made at the lane change recommended location, then it is desirable to make a lane change at the lane change recommended location. Thereafter, the processes at and after the above-described S41 are performed for another divergence point included in the route which is a processing target, and then processing transitions to S52.

On the other hand, at S51, the CPU 51 corrects the lane change locations which are temporarily set at the above-described S43. Specifically, the lane change locations are moved to a location closest to the point-of-departure side in the lane changeable area set at the above-described S41. A reason that the lane change locations are moved to the point-of-departure side is that a lane change is prevented from being made near the divergence point and it is desirable to make a lane change at the closest possible timing to the lane change recommended location. Thereafter, the processes at and after the above-described S41 are performed for another divergence point included in the route which is a processing target, and then processing transitions to S52.

Thereafter, at S52, by referring to the lane change locations set in the route which is a processing target, when a plurality of sets of lane change locations are adjacent to each other, the CPU 51 shifts one or both sets of lane change locations to insert a linear section with a predetermined distance (e.g., 100 m) or more between the adjacent sets of lane change locations. Thereafter, the lane change locations set in the route which is a processing target are fixed.

Figure 19:
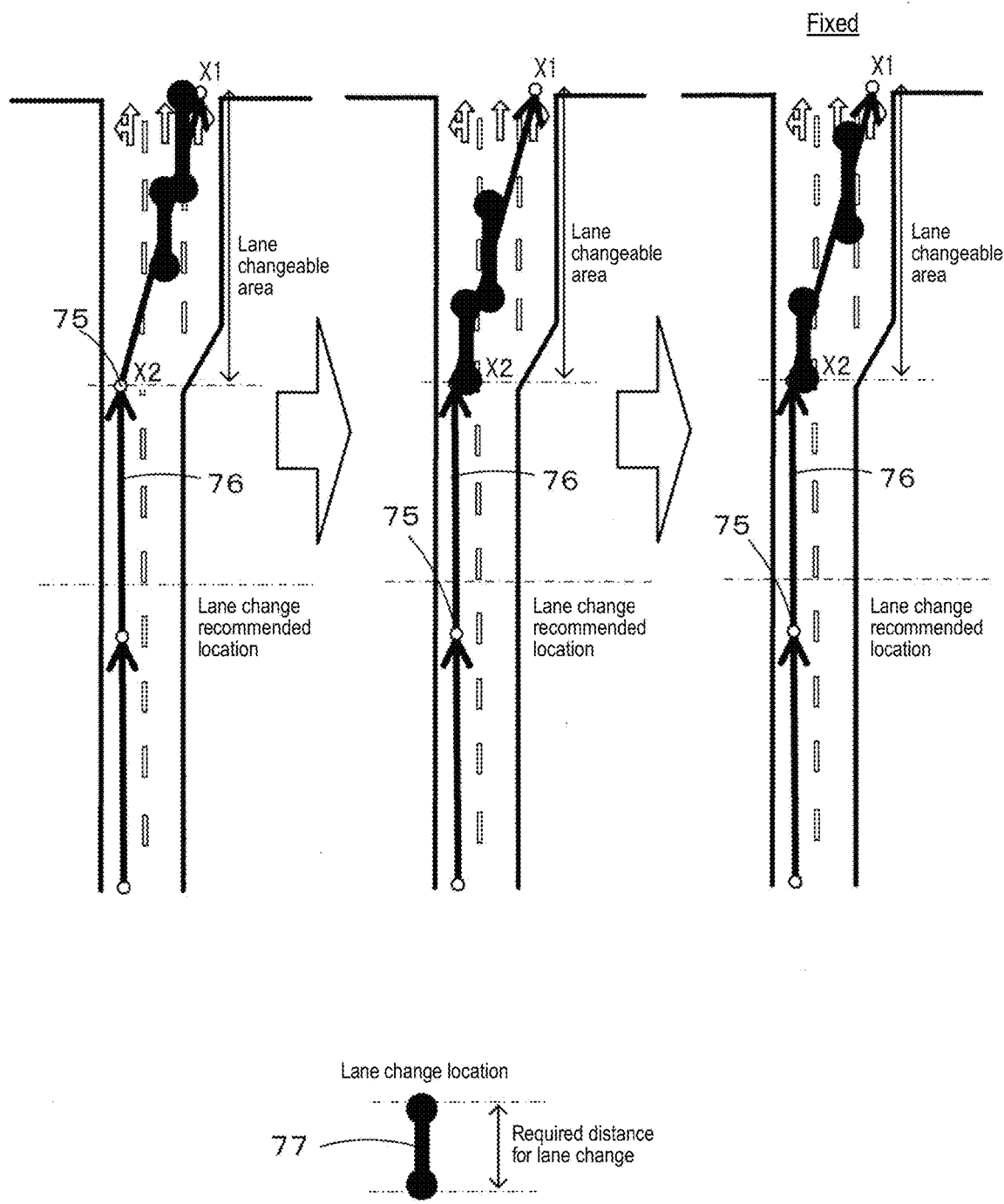
FIG. 19 is a diagram showing the flow from correction to fixing of lane change locations set for a route.

As a result of correcting the lane change locations at the above-described S45, S48, S50, S51, and S52, for example, in a route corresponding to a drawing on the left of FIG. 18, lane change locations are corrected in a flow shown in FIG. 19, and are finally fixed. Namely, sets of lane change locations which are temporarily set at the above-described S43 are more on the destination side than a lane change recommended location, and a lane changeable area does not extend across the lane change recommended location, and thus, first, the sets of lane change locations for two lanes are moved to a location closest to the point-of-departure side in the lane changeable area (S51). Then, a linear section with a predetermined distance or more is inserted between the sets of lane change locations, and the sets of lane change locations are fixed (S52).

Figure 20:
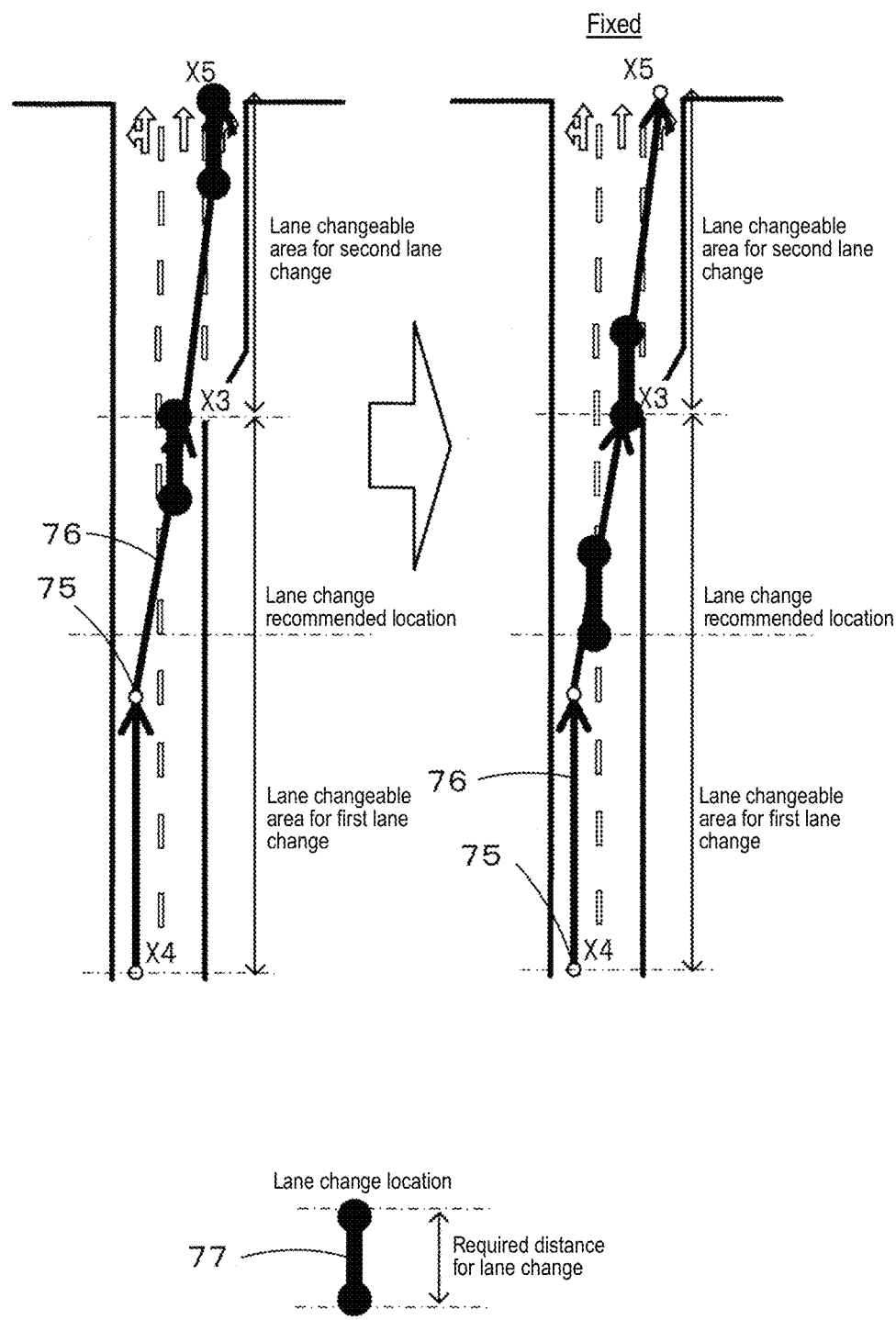
FIG. 20 is a diagram showing the flow from correction to fixing of lane change locations set for a route.

In addition, for example, in a route corresponding to a drawing in the middle of FIG. 18, lane change locations are corrected in a flow shown in FIG. 20, and are finally fixed. Namely, a set of lane change locations corresponding to the first lane change and temporarily set at the above-described S43 is more on the destination side than a lane change recommended location, and a lane changeable area extends across the lane change recommended location, and thus, first, the set of lane change locations corresponding to the first lane change is moved to the lane change recommended location (S50). In addition, a set of lane change locations corresponding to the second lane change and temporarily set at the above-described S43 is more on the destination side than the lane change recommended location, and a lane changeable area does not extend across the lane change recommended location, and thus, the set of lane change locations is moved to a location closest to the point-of-departure side in the lane changeable area (S51). The sets of lane change locations are fixed in that state.

Figure 21:
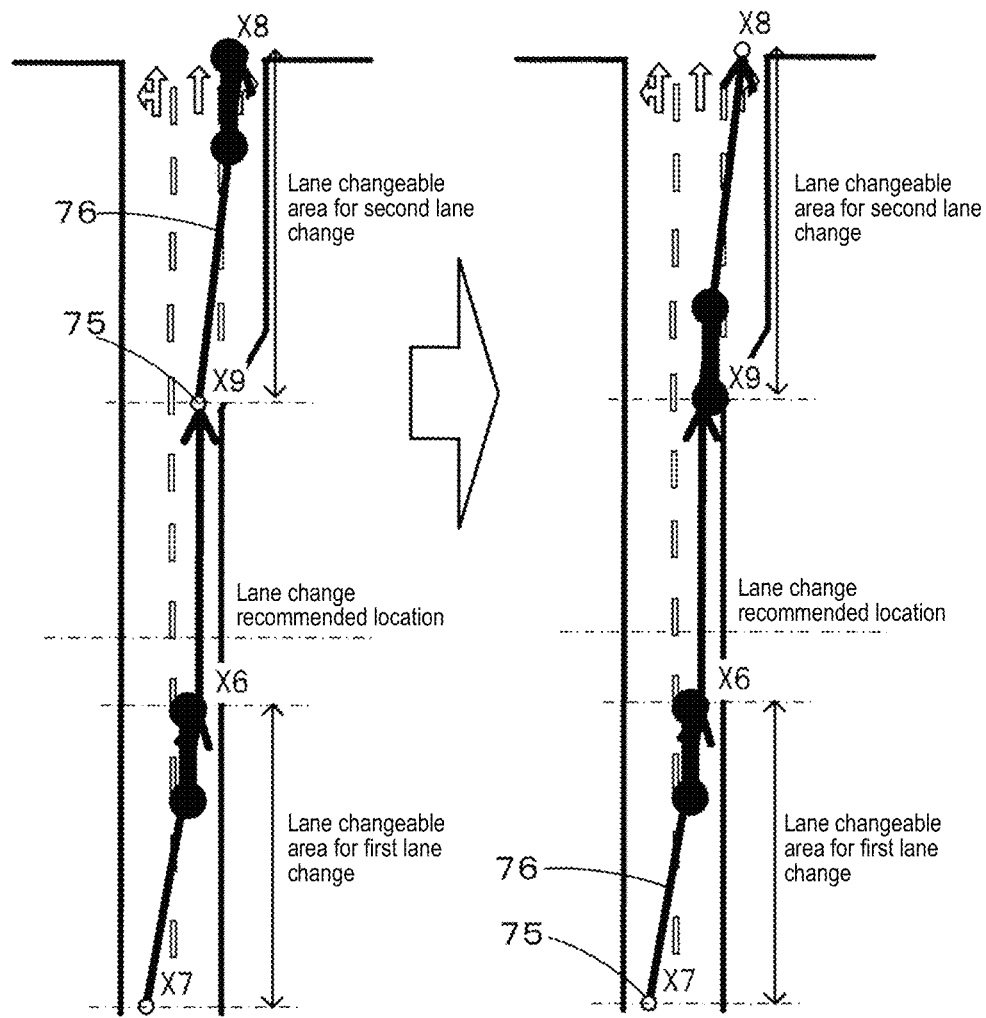
FIG. 21 is a diagram showing the flow from correction to fixing of lane change locations set for a route.
Figure 21:
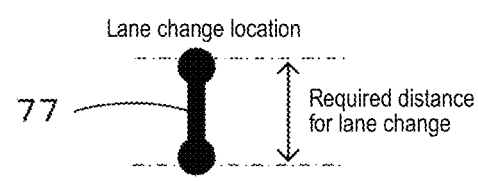

In addition, in a route corresponding to a drawing on the right of FIG. 18, lane change locations are corrected in a flow shown in FIG. 21, and are finally fixed. Namely, a set of lane change locations corresponding to the first lane change and temporarily set at the above-described S43 is more on the point-of-departure side than a lane change recommended location, and thus is not corrected (S48). In addition, a set of lane change locations corresponding to the second lane change and temporarily set at the above-described S43 is more on the destination side than the lane change recommended location, and a lane changeable area does not extend across the lane change recommended location, and thus, the set of lane change locations is moved to a location closest to the point-of-departure side in the lane changeable area (S51). The sets of lane change locations are fixed in that state.

Then, after performing the processes at the above-described S41 to S52 on the reference route and the candidate route which are generated at the above-described S25 and 26, processing transitions to S28. At and after S28, a recommended way of moving into a lane is selected based on the lane change locations set in the reference route and the candidate route.

Next, a subprocess of the dynamic travel path generating process performed at the above-described S6 will be described based on FIG. 22. FIG. 22 is a flowchart of a subprocess program of the dynamic travel path generating process.

First, at S61, the CPU 51 obtains a current location of the vehicle detected by the current location detecting part 31. Note that it is desirable to specifically identify the current location of the vehicle using, for example, highly accurate GPS information or a highly accurate location technique. Here, the highly accurate location technique is a technique in which white lines and road surface painting information captured with a camera installed on the vehicle are detected by image recognition, and furthermore, the detected white lines and road surface painting information are checked against, for example, the highly accurate map information 15, by which a driving lane and a highly accurate vehicle location can be detected. Furthermore, when the vehicle travels on a road having multiple lanes, a lane in which the vehicle travels is also identified.

Then, at S62, the CPU 51 obtains the static travel path (i.e., a next path along which the vehicle plans to travel) generated at the above-described S3 and the speed plan (i.e., a next planned speed of the vehicle) created at the above-described S4.

Then, at S63, the CPU 51 obtains, based on the highly accurate map information 15 obtained at the above-described S2, a lane configuration, section line information, etc., targeting an area ahead of the vehicle in a traveling direction, particularly, an area around the "factor that affects travel of the vehicle (hereinafter, referred to as affecting factor)" detected at the above-described S5. Note that the lane configuration and section line information obtained at the above-described S63 include, for example, information that identifies the number of lanes and how the number of lanes increases or decreases at which location when there is an increase or decrease in the number of lanes.

Subsequently, at S64, the CPU 51 obtains, for the affecting factor detected at the above-described S5, a location of the affecting factor at the present time and movement conditions (a moving direction and a moving speed) when the affecting factor is moving. Note that the location and movement conditions of the affecting factor are obtained by, for example, performing image processing, etc., on a captured image obtained by capturing a predetermined detection area around the vehicle with the exterior camera 39.

Thereafter, at S65, the CPU 51 first predicts a future moving trajectory of the affecting factor, based on the current location and movement conditions of the affecting factor obtained at the above-described S64. Note that when the affecting factor is another vehicle, the prediction may be made taking into account the turn-on/off states of turn signals and brake lights of another vehicle. Furthermore, if the future travel path and speed plan for another vehicle can be obtained by vehicle-to-vehicle communication, etc., then the prediction may be made taking into account the future travel path and speed plan. Thereafter, based on the predicted future moving trajectory of the affecting factor and the static travel path and speed plan for the vehicle obtained at the above-described S62, it is more accurately determined whether the affecting factor affects travel of the vehicle. Specifically, when it is predicted that the vehicle and the affecting factor are located in the same lane at the present time or in the future and a distance therebetween reaches within an appropriate vehicle-to-vehicle distance D, it is determined that the affecting factor affects travel of the vehicle. Note that the appropriate vehicle-to-vehicle distance D is calculated by, for example, the following equation (1):

$$D = \text{vehicle speed of the vehicle} \times 2 \text{ seconds} + \text{vehicle's braking distance} - \text{affecting factor's braking distance} \quad (1)$$

(note, however, that this equation only applies to a case in which the affecting factor is a moving object)

Then, if it is determined that the affecting factor affects travel of the vehicle (S65: YES), then processing transitions to S66. On the other hand, if it is determined that the affecting factor does not affect travel of the vehicle (S65: NO), then processing transitions to S9 (S7 and S8 are omitted) without generating a dynamic travel path.

At S66, the CPU 51 determines whether a new path for the vehicle to avoid the affecting factor and return to the static travel path (i.e., pass the affecting factor) can be generated. Specifically, when the affecting factor and the vehicle are located in the same lane at the present time, for a path where the vehicle makes a lane change to the right to pass the affecting factor in a range in which vehicle speed does not exceed a speed limit, and then makes a lane change to the left to return to an original lane, if a path that maintains an appropriate vehicle-to-vehicle distance D or more with the affecting factor can be formed, then it is determined that a new path for the vehicle to avoid the affecting factor and return to the static travel path can be generated. In addition, when the affecting factor and the vehicle are located in different lanes at the present time and thereafter move into the same lane, for a path where the vehicle passes the affecting factor in a range in which vehicle speed does not exceed a speed limit, and then makes a lane change to the same lane as the affecting factor, if a path that maintains an appropriate vehicle-to-vehicle distance D or more with the affecting factor can be formed, then it is determined that a new path for the vehicle to avoid the affecting factor and return to the static travel path can be generated. In the determination process at the above-described S66, a determination is made based on the lane configuration and section line information for an area ahead of the vehicle in the traveling direction which are obtained at the above-described S63, the current location of the vehicle, the future moving trajectory of the affecting factor, and the speed limit for a road.

Then, if it is determined that a new path for the vehicle to avoid the affecting factor and return to the static travel path (i.e., pass the affecting factor) can be generated (S66: YES), then processing transitions to S67. On the other hand, if it is determined that a new path for the vehicle to avoid the affecting factor and return to the static travel path (i.e., pass the affecting factor) cannot be generated (S66: NO), then processing transitions to S68.

Figure 23:
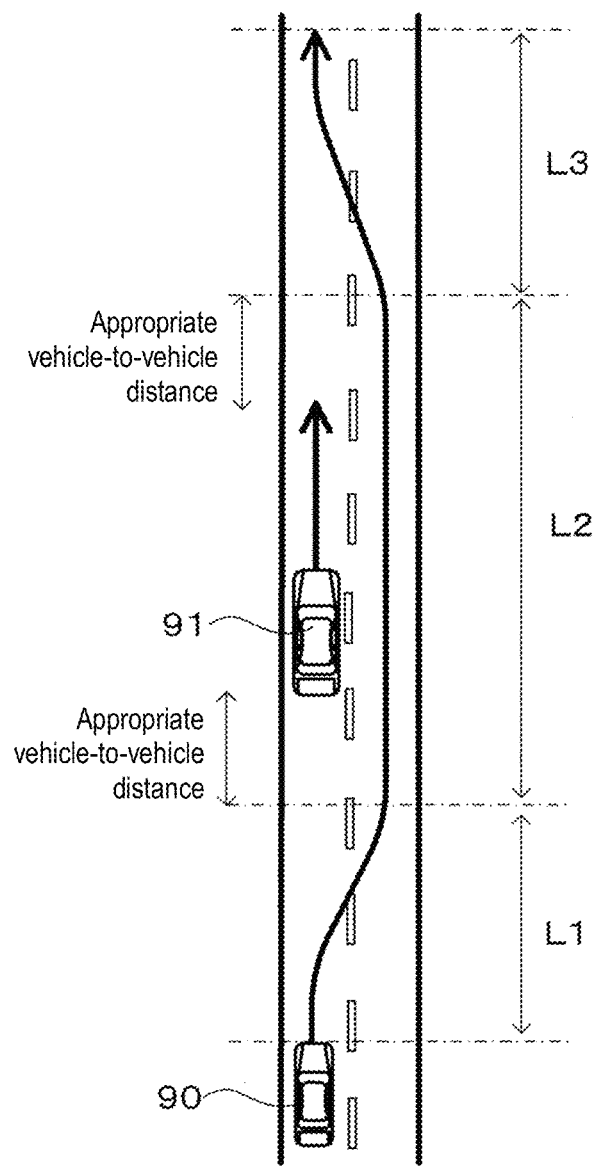
FIG. 23 is a diagram showing an example of an avoidance path which is one of dynamic travel paths.
Figure 24:
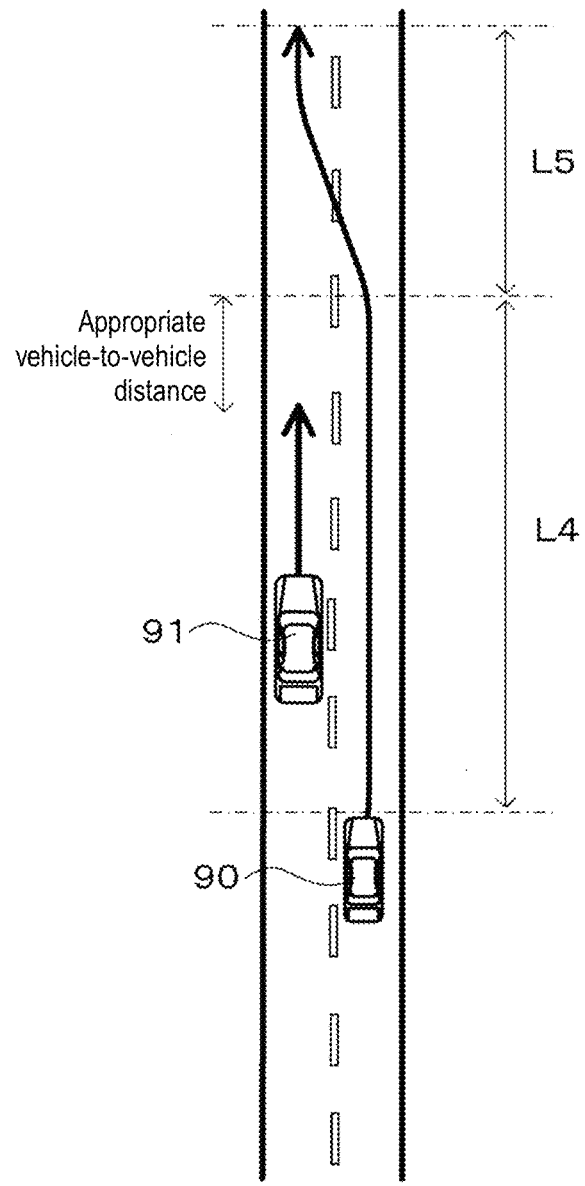
FIG. 24 is a diagram showing an example of an avoidance path which is one of dynamic travel paths.

At S67, the CPU 51 calculates a path for the vehicle to avoid the affecting factor and return to the static travel path (i.e., pass the affecting factor) (hereinafter, referred to as avoidance path). Specifically, when the vehicle and the affecting factor are located in the same lane at the present time, a path where, as shown in FIG. 23, the vehicle makes a lane change to the right to pass the affecting factor and then makes a lane change to the left to return to an original lane corresponds to an avoidance path. On the other hand, when the vehicle and the affecting factor are located in different lanes at the present time and thereafter the vehicle needs to move to the same lane as the affecting factor, a path where, as shown in FIG. 24, the vehicle passes the affecting factor and then makes a lane change to move into the same lane as the affecting factor corresponds to an avoidance path.

Here, FIG. 23 shows an example of an avoidance path generated at the above-described S67 when a vehicle 90 travels in a left lane on a road with two lanes in each direction and an affecting factor is a vehicle ahead 91 that travels in the same lane as the vehicle 90.

First, in the example shown in FIG. 23, a first path L1 is calculated that is required for the vehicle to move into a right lane by starting a turn of the steering and for the steering position to return to a straight-ahead direction. Note that for the first path L1, lateral acceleration (lateral G) occurring when a lane change is made is calculated based on the current vehicle speed of the vehicle, and on conditions that the lateral G does not interfere with autonomous driving assistance and does not exceed an upper limit value (e.g., 0.2 G) at which a passenger of the vehicle is not given discomfort, a path that is as smooth as possible and that has the shortest possible distance required for a lane change is calculated using a clothoid curve. In addition, maintaining an appropriate vehicle-to-vehicle distance D or more with the vehicle ahead 91 is also a condition.

Then, a second path L2 is calculated where the vehicle travels in the right lane with a speed limit being an upper limit, to pass the vehicle ahead 91 and an appropriate vehicle-to-vehicle distance D or more with the vehicle ahead 91 is obtained. Note that the second path L2 is basically a linear path, and the length of the path is calculated based on the vehicle speed of the vehicle ahead 91 and the speed limit for the road.

Subsequently, a third path L3 is calculated that is required for the vehicle to return to the left lane by starting a turn of the steering and for the steering position to return to the straight-ahead direction. Note that for the third path L3, lateral acceleration (lateral G) occurring when a lane change is made is calculated based on the current vehicle speed of the vehicle, and on conditions that the lateral G does not interfere with autonomous driving assistance and does not exceed an upper limit value (e.g., 0.2 G) at which a passenger of the vehicle is not given discomfort, a path that is as smooth as possible and that has the shortest possible distance required for a lane change is calculated using a clothoid curve. In addition, maintaining an appropriate vehicle-to-vehicle distance D or more with the vehicle ahead 91 is also a condition.

In addition, FIG. 24 shows an example of an avoidance path generated at the above-described S67 when in a situation in which a vehicle 90 travels in a right lane on a road with two lanes in each direction and needs to move into a left lane, the affecting factor is a vehicle ahead 91 that travels in the left lane.

First, in the example shown in FIG. 24, a first path L4 is calculated where the vehicle travels in the right lane with a speed limit being an upper limit, to pass the vehicle ahead 91 and an appropriate vehicle-to-vehicle distance D or more with the vehicle ahead 91 is obtained. Note that the first path L4 is basically a linear path, and the length of the path is calculated based on the vehicle speed of the vehicle ahead 91 and the speed limit for the road.

Subsequently, a second path L5 is calculated that is required for the vehicle to move into the left lane by starting a turn of the steering and for the steering position to return to a straight-ahead direction. Note that for the second path L5, lateral acceleration (lateral G) occurring when a lane change is made is calculated based on the current vehicle speed of the vehicle, and on conditions that the lateral G does not interfere with autonomous driving assistance and does not exceed an upper limit value (e.g., 0.2 G) at which a passenger of the vehicle is not given discomfort, a path that is as smooth as possible and that has the shortest possible distance required for a lane change is calculated using a clothoid curve. In addition, maintaining an appropriate vehicle-to-vehicle distance D or more with the vehicle ahead 91 is also a condition.

In addition, at the above-described S67, a recommended speed for the vehicle used upon traveling along the above-described avoidance path is also calculated. For the recommended speed for the vehicle, with a speed limit being an upper limit, a speed at which lateral acceleration (lateral G) occurring in the vehicle when making a lane change does not interfere with autonomous driving assistance and does not exceed an upper limit value (e.g., 0.2 G) at which a passenger of the vehicle is not given discomfort is set as the recommended speed. For example, the calculation is performed based on the curvature of the avoidance path, the speed limit, etc.

Figure 25:
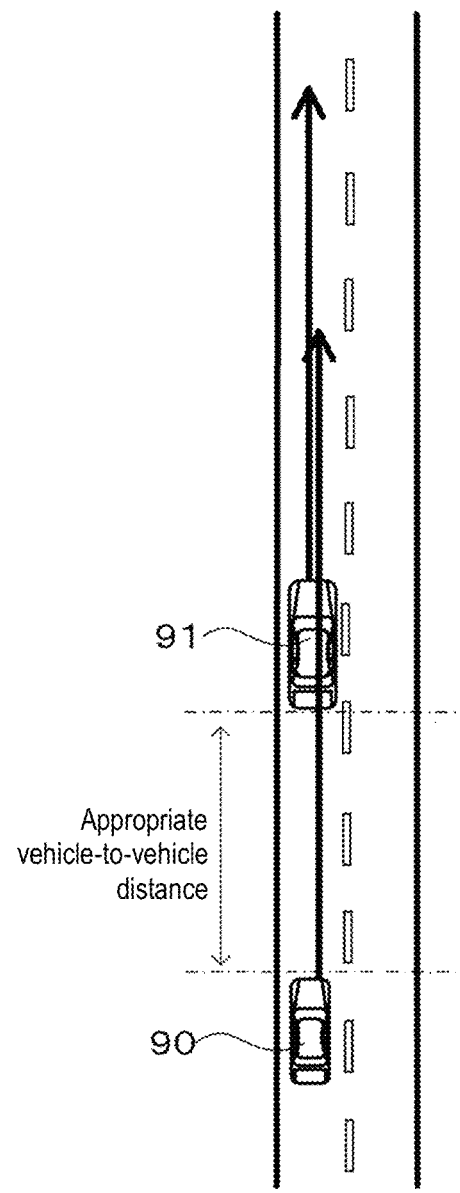
FIG. 25 is a diagram showing an example of a following path which is one of dynamic travel paths.
Figure 26:
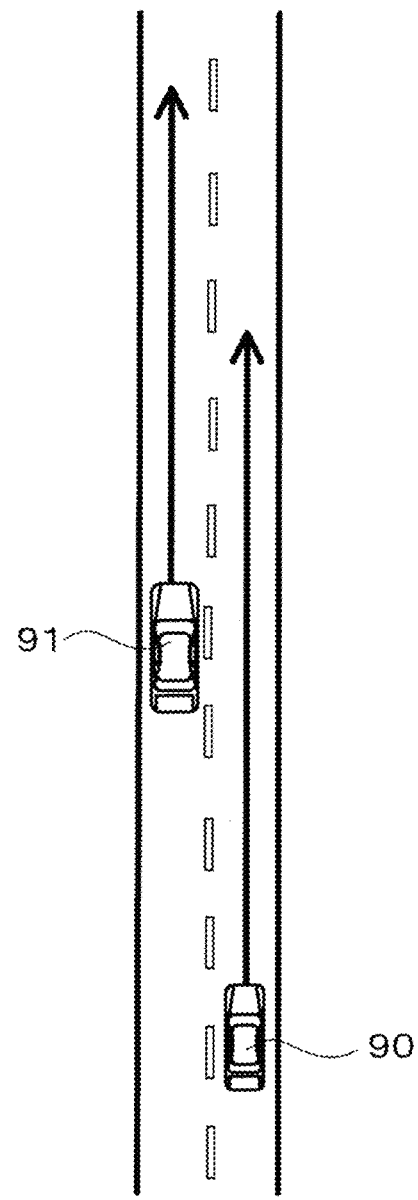
FIG. 26 is a diagram showing an example of a following path which is one of dynamic travel paths.

Thereafter, at S68, the CPU 51 calculates a path for the vehicle to travel following (or side by side with) the affecting factor (hereinafter, referred to as following path). Specifically, when the vehicle and the affecting factor are located in the same lane at the present time, a path where, as shown in FIG. 25, a vehicle 90 continues to travel in the current lane without making a lane change to follow the affecting factor (e.g., a vehicle ahead 91) corresponds to a following path. Note that the following path is basically the same path as a static travel path. Note, however, that since the vehicle-to-vehicle distance with the affecting factor needs to be appropriately maintained, as will be described later, the speed plan is modified (S8). On the other hand, when the vehicle and the affecting factor are located in different lanes at the present time and thereafter the vehicle needs to move into the same lane as the affecting factor, a path where, as shown in FIG. 26, a vehicle 90 continues to travel in the current lane without making a lane change to travel side by side with the affecting factor (e.g., a vehicle ahead 91) corresponds to a following path. Note that in this case, the following path is a path different from a static travel path.

In addition, at the above-described S68, a recommended speed for the vehicle used upon traveling along the above-described following path is also calculated. For the following speed for the vehicle, with a speed limit being an upper limit, a speed at which an appropriate vehicle-to-vehicle distance D or more is maintained for the vehicle-to-vehicle distance with the affecting factor ahead is set as the recommended speed. Note that the appropriate vehicle-to-vehicle distance D is calculated based on the above-described equation (1). Note, however, that when, as shown in FIG. 26, the vehicle and the affecting factor are located in different lanes, the vehicle-to-vehicle distance D or more does not necessarily need to be maintained, but considering the necessity for the vehicle to make a lane change thereafter to the same lane as the affecting factor, it is desirable to maintain the vehicle-to-vehicle distance D or more.

Thereafter, at S69, the CPU 51 generates the avoidance path calculated at the above-described S67 (only when the avoidance path is calculated) and the following path calculated at the above-described S68, as dynamic travel paths which are travel paths along which the vehicle is recommended to travel on a road included in the planned travel route, taking into account the surrounding road conditions.

Then, the dynamic travel paths generated at the above-described S69 are stored in the flash memory 54, etc., as assistance information used for autonomous driving assistance.

Next, a subprocess of the travel path reflecting process performed at the above-described S7 will be described based on FIG. 27. FIG. 27 is a flowchart of a subprocess program of the travel path reflecting process.

First, at S71, the CPU 51 reads the static travel path generated at the above-described S3 and the dynamic travel paths generated at the above-described S6 from a storage medium such as the flash memory 54.

Subsequently, at S72, for each travel path read at the above-described S71, the CPU 51 calculates, for each travel path, a path cost indicating the level of appropriateness as a travel path for the vehicle. Here, the path cost is calculated taking into account at least one of (a) travel time (average vehicle speed), (b) the number of lane changes, (c) locations where a lane change is made, and (d) a driving lane. Specifically, the calculation is performed based on the following conditions.

For (a) "travel time (average vehicle speed)", a higher path cost is calculated for a travel path with longer travel time (i.e., a lower average vehicle speed). Note that an average vehicle speed for the static travel path is identified based on the speed plan created at the above-described S4. On the other hand, for the dynamic travel paths, an average vehicle speed is identified based on the recommended speeds calculated at the above-described S67 and S68.

For (b) "the number of lane changes", a higher path cost is calculated for a travel path with a larger number of lane changes.

For (c) "locations where a lane change is made", when a plurality of lane changes are made, a higher path cost is calculated for a travel path with a shorter interval between lane changes. In addition, for a travel path where a lane change is made within a predetermined distance before an intersection (e.g., 700 m for general roads and 2 km for expressways), a path cost is added.

For (d) "a driving lane", a higher path cost is calculated for a travel path with a longer travel distance of a passing lane.

Note, however, that regardless of the above-described conditions (a) to (d), for a travel path that is determined to cause the vehicle to come into contact with the affecting factor detected at the above-described S5, the cost is infinity.

Thereafter, at S73, the CPU 51 compares the path costs for each travel path which are calculated at the above-described S72, and selects a travel path with the smallest value of the path cost as a travel path along which the vehicle is recommended to travel.

Then, at S74, the CPU 51 determines whether an avoidance path or a following path which is a dynamic travel path is selected at the above-described S73.

Then, if it is determined that an avoidance path or a following path which is a dynamic travel path is selected at the above-described S73 (S74: YES), then processing transitions to S75.

At S75, the CPU 51 consequently replaces the static travel path by the dynamic travel path, targeting a section for which the selected dynamic travel path is generated. Note that basically, when the static travel path is replaced by the dynamic travel path, the starting point and end point of the dynamic path are connected to the static travel path, but exceptionally, when the following path shown in FIG. 26 is selected, the end point of the dynamic travel path may not be connected to the static travel path. In such a case, a static travel path may be newly generated with the end point of the dynamic travel path being a starting point of the static travel path, or a dynamic travel path may be repeatedly generated at regular intervals until the dynamic travel path is connected to the static travel path.

Thereafter, assistance travel by autonomous driving assistance is performed based on the static travel path, a part of which is replaced by the dynamic travel path (S9 and S10).

On the other hand, if it is determined that the static travel path is selected at the above-described S73 (S74: NO), then processing transitions to S8 without replacing by a dynamic travel path.

As described in detail above, the navigation device 1 and a computer program executed by the navigation device 1, according to the present embodiment obtain a planned travel route along which the vehicle travels (S1), and further identify and obtain candidates for a way of moving into a lane that can be selected when the vehicle moves along the planned travel route, by using map information including lane configurations and using a lane network (S25 and S26). Then, for a candidate for a way of moving into a lane that involves a lane change among the obtained candidates for a way of moving into a lane, a lane change start location at which a lane change starts and a lane change end location at which the lane change ends are set at a location close to a destination on a priority basis (S43), and taking into account the set lane change start locations and lane change end locations, a way of moving into a lane for the vehicle that is recommended when the vehicle moves is selected from among the candidates for a way of moving into a lane (S29), and thus, it becomes possible to appropriately select a way of moving into a lane that makes a recommended lane change. As a result, an unrecommended lane change is prevented from being made when the vehicle travels, enabling appropriate provision of driving assistance.

Note that the present disclosure is not limited to the above-described embodiment, and it is, of course, possible to make various modifications and alterations thereto without departing from the spirit and scope of the present disclosure.

For example, in the present embodiment, for each of the candidates for a way of moving into a lane that involves a lane change, lane change locations (77) at which a lane change is made are set at a location close to a destination on a priority basis, and the lane change locations (77) are shifted toward a point-of-departure side in a subsequent process so as to reduce a lane change cost, but reversely, lane change locations (77) at which a lane change is made may be set at a location close to a point of departure on a priority basis, and the lane change locations (77) may be shifted toward a destination point side in a subsequent process on condition that a lane change cost does not increase.

In addition, in the present embodiment, when an affecting factor that affects travel of the vehicle is detected, each of an avoidance path and a following path is generated as a dynamic travel path, but only either one of the dynamic travel paths may be generated.

In addition, in the present embodiment, the highly accurate map information included in the server device 4 includes both of pieces of information about the lane configurations of roads (lane-by-lane road configurations, curvatures, lane widths, etc.) and about section lines painted on roads (roadway centerlines, lane boundary lines, roadway outer lines, guidelines, etc.), but may include only the information about section lines or may include only the information about the lane configurations of roads. For example, even when only the information about section lines is included, information corresponding to the information about the lane configurations of roads can be estimated based on the information about section lines. In addition, even when only the information about the lane configurations of roads is included, information corresponding to the information about section lines can be estimated based on the information about the lane configurations of roads. In addition, the "information about section lines" may be information that identifies the types or layout of section lines themselves that mark off lanes, or may be information that identifies whether a lane change can be made between adjacent lanes, or may be information that directly or indirectly identifies lane configurations.

In addition, in the present embodiment, when an affecting factor that affects travel of the vehicle is detected, dynamic travel paths are generated and a comparison is made between the path costs of an existing static travel path and the newly generated dynamic travel paths (S72 and S73), and only when it is determined that a dynamic travel path is recommended over the static travel path, the static travel path is replaced by the dynamic travel path (S75), but when a dynamic travel path is generated, the static travel path may always be replaced by the dynamic travel path.

In addition, in the present embodiment, as means for reflecting a dynamic travel path in a static travel path, a part of the static travel path is replaced by the dynamic travel path (S75), but instead of replacement, the path may be modified to approximate the static travel path to the dynamic travel path.

In addition, in the present embodiment, control, by the vehicle control ECU 40, of all of an accelerator operation, a brake operation, and a steering wheel operation which are operations related to the behavior of the vehicle among vehicle operations is described as autonomous driving assistance for performing autonomous travel independently of user's driving operations. However, the autonomous driving assistance may be control, by the vehicle control ECU 40, of at least one of an accelerator operation, a brake operation, and a steering wheel operation which are operations related to the behavior of the vehicle among vehicle operations. On the other hand, manual driving by user's driving operations is described as performing, by the user, of all of an accelerator operation, a brake operation, and a steering wheel operation which are operations related to the behavior of the vehicle among vehicle operations.

In addition, driving assistance of the present disclosure is not limited to autonomous driving assistance related to autonomous driving of the vehicle. For example, it is also possible to provide driving assistance by displaying a static travel path and a dynamic travel path on a navigation screen and providing guidance using voice, a screen, etc. (e.g., guidance on a lane change and guidance on a recommended vehicle speed). In addition, user's driving operations may be assisted by displaying a static travel path and a dynamic travel path on a navigation screen.

In addition, although, in the present embodiment, the configuration is such that the autonomous driving assistance program (FIG. 4) is executed by the navigation device 1, the configuration may be such that an in-vehicle device or the vehicle control ECU 40 other than the navigation device 1 executes the autonomous driving assistance program. In that case, the configuration is such that the in-vehicle device or the vehicle control ECU 40 obtains a current location of the vehicle, map information, etc., from the navigation device 1 or the server device 4. Furthermore, the server device 4 may perform some or all of the steps of the autonomous driving assistance program (FIG. 4). In that case, the server device 4 corresponds to a drive assistance device of the present application.

In addition, aspects of the present disclosure can also be applied to mobile phones, smartphones, tablet terminals, personal computers, etc., (hereinafter, referred to as a portable terminal, etc.) in addition to navigation devices. In addition, it becomes possible to apply the aspects of the present disclosure to a system including a server and a portable terminal, etc. In that case, the configuration may be such that each step of the above-described autonomous driving assistance program (see FIG. 4) is performed by either one of the server and the portable terminal, etc. Note, however, that when the aspects of the present disclosure are applied to the portable terminal, etc., a vehicle that can provide autonomous driving assistance and the portable terminal, etc. need to be connected to each other in a communicable manner (it does not matter whether they are connected by wire or wirelessly).

In addition, although an implementation example that embodies the drive assistance device according to the present disclosure are described above, the drive assistance device can also have the following configurations, and in that case, the following advantageous effects are provided.

For example, a first configuration is as follows:

The drive assistance device includes planned travel route obtaining means (51) for obtaining a planned travel route along which a vehicle (5) travels; lane network obtaining means (51) for obtaining a lane network for the planned travel route, based on map information including lane configurations, the lane network being a network representing movement into a lane that can be selected by the vehicle; candidate obtaining means (51) for identifying and obtaining, using the lane network, candidates for a way of moving into a lane that can be selected when the vehicle moves along the planned travel route; lane change location setting means (51) for setting, for the candidate for a way of moving into a lane that involves a lane change among the candidates for a way of moving into a lane obtained by the candidate obtaining means, a lane change start location at which a lane change starts and a lane change end location at which the lane change ends, at a location close to a destination on a priority basis; recommended way-of-moving selecting means (51) for selecting a way of moving into a lane for the vehicle that is recommended when the vehicle moves, from among the candidates for a way of moving into a lane, taking into account the lane change start location and lane change end location set by the lane change location setting means; and driving assistance means (51) for providing driving assistance for the vehicle to move in accordance with the way of moving into a lane selected by the recommended way-of-moving selecting means.

According to the drive assistance device having the above-described configuration, candidates for a way of moving into a lane that can be selected by the vehicle are identified and obtained using a lane network, and for each candidate, a lane change start location at which a lane change starts and a lane change end location at which the lane change ends are set in advance at a location close to a destination on a priority basis, and in that state, a recommended way of moving into a lane is selected from among the candidates for a way of moving into a lane, and thus, it becomes possible to appropriately select a way of moving into a lane that makes a recommended lane change. As a result, an unrecommended lane change is prevented from being made when the vehicle travels, enabling appropriate provision of driving assistance.

In addition, a second configuration is as follows:

The lane network is a network that divides the planned travel route into a plurality of segments, and sets a node (75) at a portion of each lane located at a boundary of each divided segment, and includes a link (76) that connects set nodes, and for the candidates for a way of moving into a lane obtained by the candidate obtaining means, a lane in which the vehicle travels and a location at which a lane change is made are identified by a link included in the lane network.

According to the drive assistance device having the above-described configuration, it becomes possible to provide assistance for the vehicle to travel in accordance with a way of moving into a lane that makes a recommended lane change.

In addition, a third configuration is as follows:

The drive assistance device includes area setting means (51) for setting, for the candidate for a way of moving into a lane that involves a lane change among the candidates for a way of moving into a lane obtained by the candidate obtaining means (51), a lane changeable area for each of included lane changes, the lane changeable area being an area in which a lane change can be made, and the lane change location setting means sets the lane change start location and the lane change end location in the lane changeable area.

According to the drive assistance device having the above-described configuration, for a candidate for a way of moving into a lane, a lane change start location and a lane change end location are set in advance at a location at which a lane change can be made, and thus, whichever candidate is selected as a recommended way of moving into a lane for the vehicle, driving assistance can be appropriately provided based on the selected way of moving into a lane.

In addition, a fourth configuration is as follows:

The recommended way-of-moving selecting means (51) calculates, for each of the candidates for a way of moving into a lane, a cost taking into account the lane change start location and lane change end location set by the lane change location setting means, and compares the calculated costs to select a way of moving into a lane for the vehicle that is recommended when the vehicle moves, from among the candidates for a way of moving into a lane.

According to the drive assistance device having the above-described configuration, by using costs that take into account a lane change start location and a lane change end location, a way of moving into a lane that makes a lane change at the most recommended location can be appropriately selected. By providing driving assistance based on the selected way of moving into a lane, driving assistance can be appropriately provided.

In addition, a fifth configuration is as follows:

The drive assistance device includes recommended location setting means (51) for setting, for the candidate for a way of moving into a lane that involves a lane change made to pass through a divergence point among the candidates for a way of moving into a lane obtained by the candidate obtaining means (51), a recommended location at a point a predetermined distance before the divergence point; and recommended location correcting means (51) for correcting the lane change start location and the lane change end location that are set more on the divergence point side than the recommended location among the lane change start locations and lane change end locations set by the lane change location setting means (51), such that the lane change start location and the lane change end location approach the recommended location.

According to the drive assistance device having the above-described configuration, a lane change start location and a lane change end location that are set in a candidate for a way of moving into a lane can be corrected to approach as close as possible to a location at which a lane change is recommended. As a result, driving assistance can be appropriately provided based on a way of moving into a lane that makes a lane change at a recommended location.

In addition, a sixth configuration is as follows:

The recommended way-of-moving selecting means (51) selects the candidate for a way of moving into a lane on a priority basis that makes a lane change at a location close to the recommended location, as a way of moving into a lane for the vehicle that is recommended when the vehicle moves.

According to the drive assistance device having the above-described configuration, a way of moving into a lane that makes a lane change at the closest possible timing to a location at which a lane change is recommended can be selected as a way of moving into a lane for the vehicle that is recommended when the vehicle moves. As a result, an unrecommended lane change is prevented from being made when the vehicle travels, enabling appropriate provision of driving assistance.

In addition, a seventh configuration is as follows:

The recommended way-of-moving selecting means (51) selects the candidate for a way of moving into a lane on a priority basis that has a short distance to travel in a passing lane, as a way of moving into a lane for the vehicle that is recommended when the vehicle moves.

According to the drive assistance device having the above-described configuration, a way of moving into a lane that has the shortest possible distance to move in a passing lane can be selected as a way of moving into a lane for the vehicle that is recommended when the vehicle moves.

In addition, an eighth configuration is as follows:

The drive assistance device includes space correcting means for correcting, for the candidate for a way of moving into a lane that involves a plurality of lane changes among the candidates for a way of moving into a lane obtained by the candidate obtaining means (51), a plurality of sets of the lane change locations set by the lane change location setting means (51) such that the plurality of sets of the lane change locations are spaced apart by a predetermined space or more.

According to the drive assistance device having the above-described configuration, lane change locations can be corrected so that a plurality of lane changes are not continuously made. As a result, unrecommended lane changes are prevented from being made when the vehicle travels, enabling appropriate provision of driving assistance.

REFERENCE SIGNS LIST

1: Navigation device, 2: Drive assistance system, 3: Information delivery center, 4: Server device, 5: Vehicle, 15: Highly accurate map information, 33: Navigation ECU, 39: Exterior camera, 40: Vehicle control ECU, 51: CPU, 52: RAM, 53: ROM, 54: Flash memory, 61: Planned travel route, 75: Lane node, 76: Lane link, and 77: Lane change location

The invention claimed is:

1. A drive assistance device comprising:
a memory storing instructions; and
at least one processor configured to execute the instructions to:
obtain a planned travel route along which a vehicle travels;
obtain a lane network for the planned travel route, based on map information including lane configurations, the lane network being a network representing movement into a lane that can be selected by a vehicle;
identify and obtain, using the lane network, candidates for a way of moving into a lane that can be selected when a vehicle moves along the planned travel route;
set, for the candidate for a way of moving into a lane that involves a lane change within a road section between intersections among the candidates for a way of moving into a lane, a lane change start location at which a lane change starts and a lane change end location at which a lane change ends, at a location close to a destination on a priority basis;
select a way of moving into a lane for a vehicle that is recommended when a vehicle moves, from among the candidates for a way of moving into a lane, taking into account the lane change start location and the lane change end location set;
driving assist to control at least one of acceleration, steering and braking for a vehicle to move in accordance with a way of moving into a lane selected by the recommended way-of-moving selector; and
set, for the candidate for a way of moving into a lane that involves a lane change among the candidates for a way of moving into a lane obtained by the candidate obtainer, a lane changeable area for each of included lane changes, the lane changeable area being an area in which a lane change can be made,
wherein
the lane change start location and the lane change end location are set close to a destination on a priority basis in the lane changeable area, and
adds a lane node to the lane change start position where the lane change starts and the lane change end position where the lane change ends.

2. The drive assistance device according to claim 1, wherein
the lane network is a network that divides the planned travel route into a plurality of segments, and sets a node at a portion of each lane located at a boundary of each divided segment, and includes a link that connects set nodes, and
for the candidates for a way of moving into a lane obtained by the candidate obtainer, a lane in which a vehicle travels and a location at which a lane change is made are identified by a link included in the lane network.

3. The drive assistance device according to claim 1, wherein the selecting the way of moving into the lane for the vehicle that is recommended when the vehicle moves, from among the candidates for the way of moving into the lane, taking into account the lane change start location and the lane change end location set
further includes calculating, for each of the candidates for a way of moving into a lane, a cost taking into account the lane change start location and the lane change end location set by the lane change location setter, and comparing calculated costs to select a way of moving into a lane for a vehicle that is recommended when a vehicle moves, from among the candidates for a way of moving into a lane.

4. The drive assistance device according to claim 1, further comprising:

set, for the candidate for a way of moving into a lane that involves a lane change made to pass through a divergence point among the candidates for a way of moving into a lane obtained by the candidate obtainer, a recommended location at a point a predetermined distance before the divergence point; and correct the lane change start location and the lane change end location that are set more on the divergence point side than the recommended location among the lane change start locations and the lane change end locations set by the lane change location setter, such that the lane change start location and the lane change end location approach the recommended location.

5. A non-transitory computer-readable storage medium storing a program for causing a computer to function as:

planned travel route obtainer for obtaining a planned travel route along which a vehicle travels;

lane network obtainer for obtaining a lane network for the planned travel route, based on map information including lane configurations, the lane network being a network representing movement into a lane that can be selected by a vehicle;

candidate obtainer for identifying and obtaining, using the lane network, candidates for a way of moving into a lane that can be selected when a vehicle moves along the planned travel route;

lane change location setter for setting, for the candidate for a way of moving into a lane that involves a lane change within a road section between intersections among the candidates for a way of moving into a lane obtained by the candidate obtainer, a lane change start location at which a lane change starts and a lane change end location at which a lane change ends, at a location close to a destination on a priority basis;

recommended way-of-moving selector for selecting a way of moving into a lane for a vehicle that is recommended when a vehicle moves, from among the candidates for a way of moving into a lane, taking into account the lane change start location and the lane change end location set by the lane change location setter;

driving assistor for providing driving assistance to control at least one of acceleration, steering and braking for a vehicle to move in accordance with a way of moving into a lane selected by the recommended way-of-moving selector; and area setter for setting, for the candidate for a way of moving into a lane that involves a lane change among the candidates for a way of moving into a lane obtained by the candidate obtainer, a lane changeable area for each of included lane changes, the lane changeable area being an area in which a lane change can be made, wherein the lane change location setter sets the lane change start location and the lane change end location close to a destination on a priority basis in the lane changeable area, and adds a lane node to the lane change start position where the lane change starts and the lane change end position where the lane change ends.

* * * * *